(12) United States Patent
Issa et al.

(10) Patent No.: US 8,355,678 B2
(45) Date of Patent: Jan. 15, 2013

(54) SYSTEM AND METHOD FOR CONTROLLING COMMUNICATIONS DURING AN E-READER SESSION

(75) Inventors: Alfredo C. Issa, Apex, NC (US); Richard J. Walsh, Raleigh, NC (US); Michael W. Helpingstine, Chapel Hill, NC (US)

(73) Assignee: Oto Technologies, LLC, Raleigh, NC (US)

( * ) Notice: Subject to any disclaimer, the term of this patent is extended or adjusted under 35 U.S.C. 154(b) by 422 days.

(21) Appl. No.: 12/574,757

(22) Filed: Oct. 7, 2009

(65) Prior Publication Data

US 2011/0081867 A1    Apr. 7, 2011

(51) Int. Cl.
*H04B 7/00* (2006.01)
(52) U.S. Cl. .................................... 455/66.1
(58) Field of Classification Search .................. None
See application file for complete search history.

(56) References Cited

U.S. PATENT DOCUMENTS

| | | | |
|---|---|---|---|
| 5,761,485 A | 6/1998 | Munyan | |
| 6,044,420 A * | 3/2000 | Matsunaga et al. | 710/58 |
| 6,826,399 B1 * | 11/2004 | Hoffman et al. | 455/433 |
| 7,057,591 B1 | 6/2006 | Hautanen et al. | |
| 2002/0085511 A1 | 7/2002 | Koponen et al. | |
| 2002/0087555 A1 * | 7/2002 | Murata | 707/10 |
| 2002/0091713 A1 * | 7/2002 | Walker | 707/200 |
| 2002/0152264 A1 * | 10/2002 | Yamasaki | 709/203 |
| 2002/0191775 A1 | 12/2002 | Boies et al. | |
| 2004/0014484 A1 * | 1/2004 | Kawashima | 455/550.1 |
| 2004/0235520 A1 * | 11/2004 | Cadiz et al. | 455/557 |
| 2007/0032267 A1 * | 2/2007 | Haitani et al. | 455/556.2 |
| 2007/0094742 A1 * | 4/2007 | Morita et al. | 726/26 |
| 2007/0129112 A1 * | 6/2007 | Tarn | 455/566 |
| 2008/0051074 A1 * | 2/2008 | Twerdahl et al. | 455/418 |
| 2008/0189608 A1 * | 8/2008 | Nurmi | 715/273 |
| 2009/0271486 A1 * | 10/2009 | Ligh et al. | 709/206 |
| 2010/0062753 A1 * | 3/2010 | Wen et al. | 455/418 |
| 2010/0124906 A1 * | 5/2010 | Hautala | 455/412.1 |
| 2010/0146115 A1 * | 6/2010 | Bezos | 709/225 |
| 2010/0248755 A1 * | 9/2010 | Vance et al. | 455/466 |
| 2011/0028130 A1 * | 2/2011 | Swaminathan et al. | 455/414.1 |

FOREIGN PATENT DOCUMENTS

| | | | |
|---|---|---|---|
| CN | 1777197 A | | 5/2006 |
| JP | 2001265566 A | | 9/2001 |
| JP | 2004147091 | * | 5/2004 |
| JP | 2004259233 | * | 9/2004 |
| JP | 2006004409 | * | 1/2006 |
| KR | 20020089795 A | | 11/2002 |

* cited by examiner

*Primary Examiner* — Zhiyu Lu
(74) *Attorney, Agent, or Firm* — Withrow & Terranova, PLLC

(57) ABSTRACT

A gatekeeper function is employed to control communications intended for a target user, who is associated with an electronic reader (e-reader) device. The gatekeeper function detects an attempt for an originating user to communicate with the target user. Upon detecting the attempt to communicate with the target user, the gatekeeper function determines a communication processing action that controls how to handle the communication attempt based on e-reader session information that is collected while the target user is engaged in an e-reader session. The gatekeeper function will then effect the communication processing action to control how the communication attempt is to be handled.

32 Claims, 17 Drawing Sheets

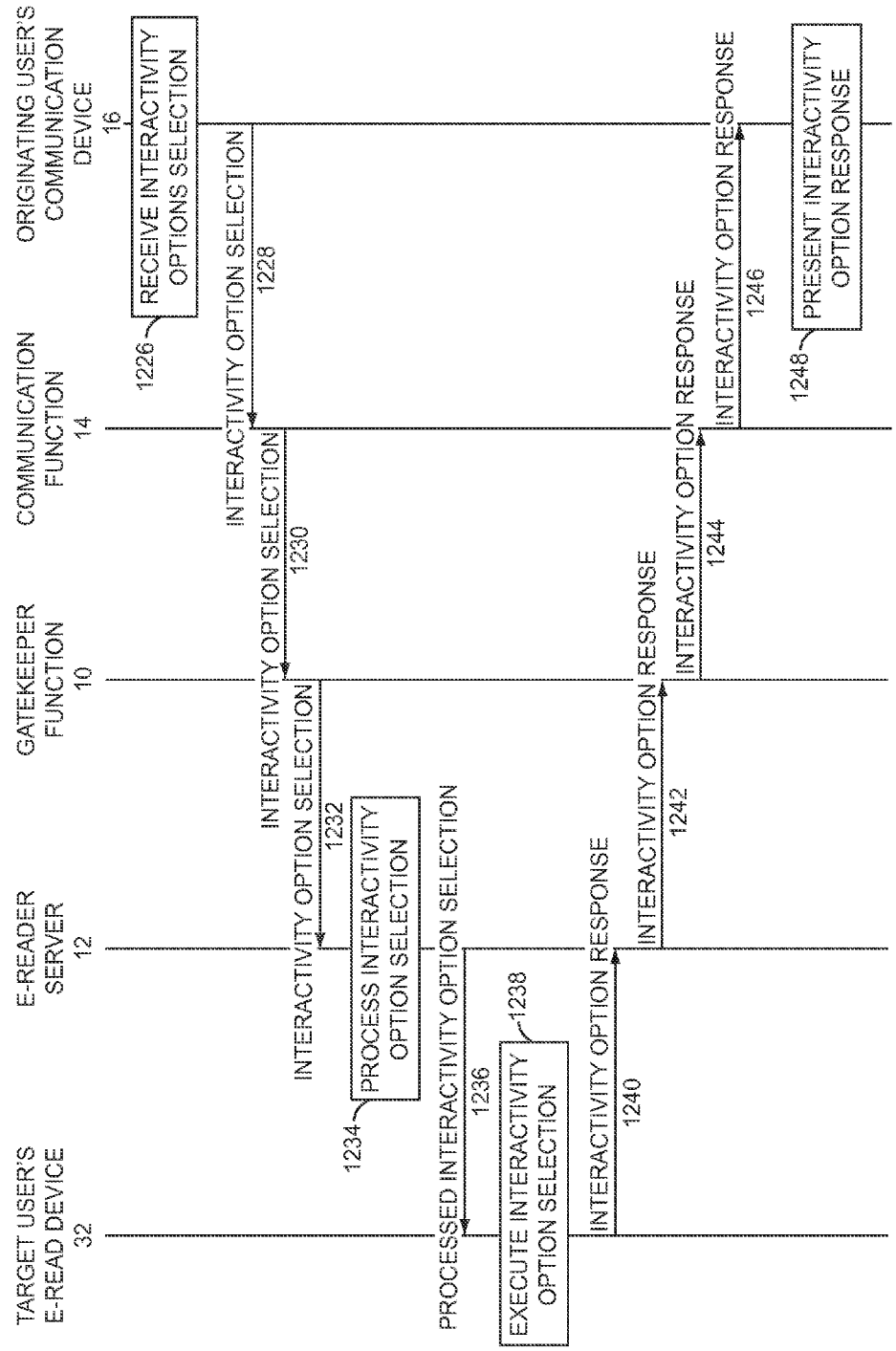

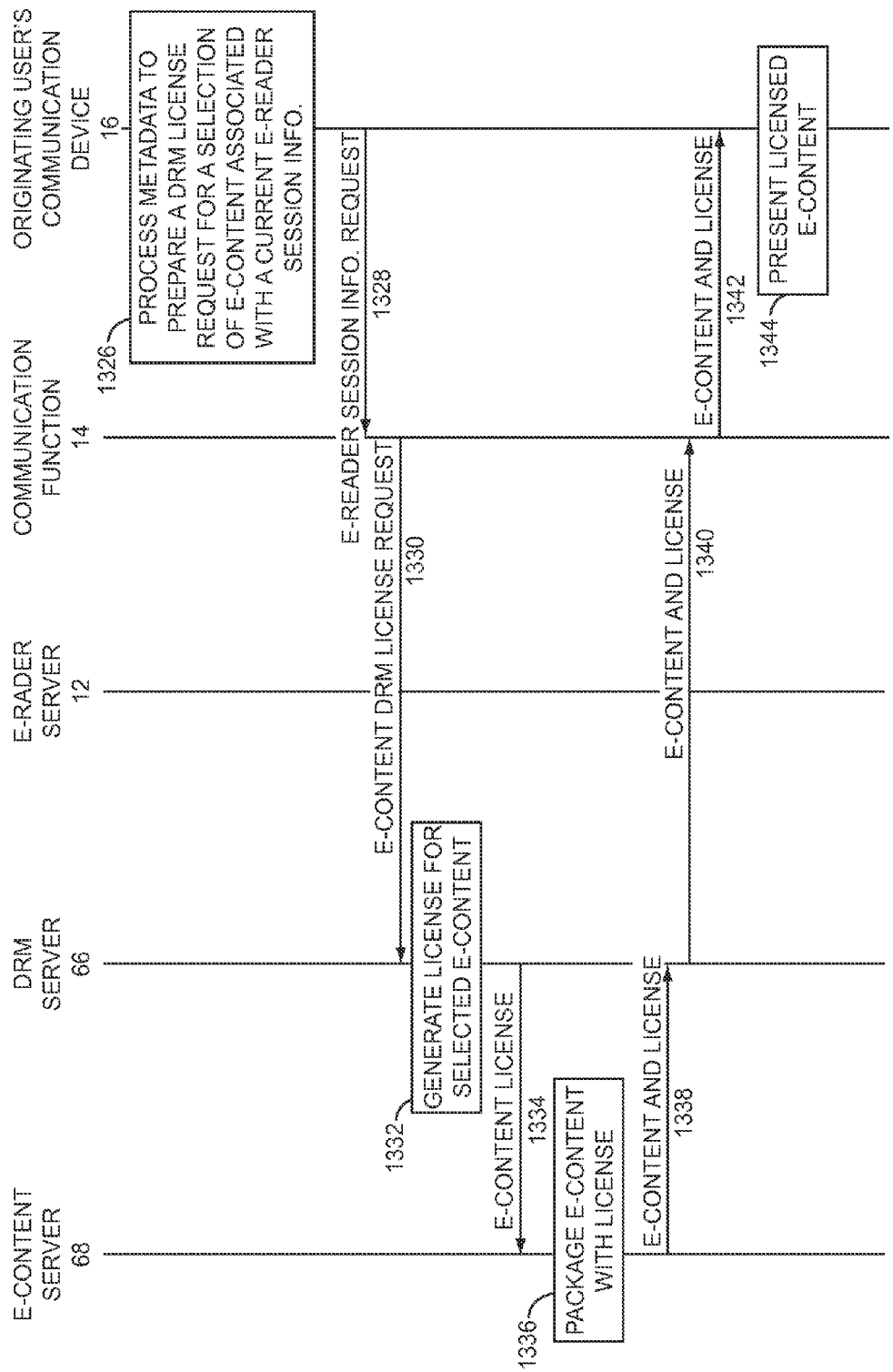

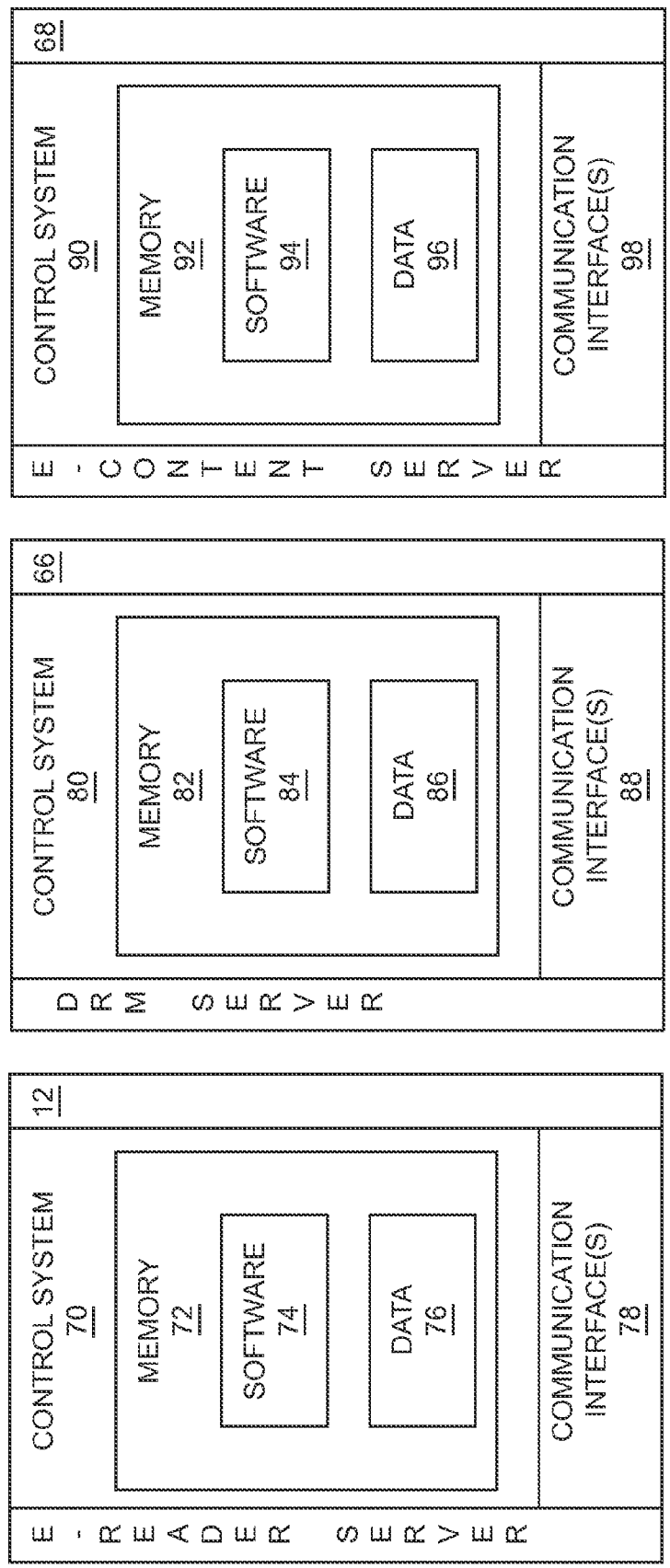

SYSTEM AND METHOD FOR CONTROLLING COMMUNICATIONS DURING AN E-READER SESSION

FIELD OF THE DISCLOSURE

The present disclosure relates to electronic books and applications. In particular, the present disclosure relates to improving the quality of e-reader sessions by controlling incoming communications and optionally collecting data during e-reader sessions.

BACKGROUND OF THE DISCLOSURE

Reading sessions involving electronic books, or eBooks, have grown rapidly in popularity, and the electronic nature of the eBook experience presents new opportunities and challenges as the frontier of eBook technology advances. Many of the new opportunities and challenges pertain to enhancing the eBook reading environment.

An eBook is an electronic version of a traditional print book that can be read by using an electronic reader, or e-reader device. E-reader functionality may be provided on a dedicated e-reader device such as an Amazon.com Kindle™, or provided as an additional function of a communication device, such as a mobile telephone, personal digital assistant, personal computer, or the like. Any device that provides e-reader functionality is rendered an e-reader device.

The eBook content is downloaded to the e-reader device and then presented to a user, generally on a page by page basis. E-reader devices provide user interfaces that are used to virtually turn pages and provide input for searching or requesting particular eBook content. Once a page is read, the user can instruct the e-reader device to present the next page and so on and so forth. In response to a search query, content or pages responsive to the query are presented. Moreover, an e-reader device typically has wireless connectivity for downloading content and conducting other Web-based tasks such as browsing the Internet and receiving email.

During an e-reader session, a user reading an eBook may become so captivated by the content of the eBook that they will not want to be interrupted until after they have completed a chapter or otherwise come to a desirable stopping point. For this reason, many eBook and traditional book readers will seek out areas of quiet privacy to begin their reading session. However, modern society has become accustomed to generating a great number of interruptions via modern communication activities such as, but not limited to, voice telephone, text messaging, multimedia transmissions, and email. As a result, a reader will very likely be interrupted several times during a reading session, making the reading session a frustrating experience. Thus, there is a need for a technique for controlling communications during an e-reader session, such that unwanted interruptions due to modern communication activities are controlled, if not altogether eliminated.

Additionally, great benefits could be realized for the eBook reading community if modern messaging capabilities could be exploited to share data collected from e-reader sessions. For example, members of a book club might want to share information concerning each individual's progress through a particular eBook. Moreover, the book club's members might also want to share information such as the title, author, and other general information pertaining to a particular eBook that the members are reading.

In yet another example, an eBook distributor might offer incentives to a large number of its eBook readers such that the eBook readers will want to cooperate with the eBook distributor to share data collected during e-reader sessions. Thus, there is also a need for a technique to manage an e-reader session, such that information gathered during e-reader sessions can be shared with entities, such as book distributors or other individuals.

SUMMARY OF THE DISCLOSURE

For the purpose of this disclosure, originating users are individuals or entities that use communication devices to initiate communication directed to target users engaged in an electronic reader (e-reader) session. These communications can be, but are not limited to, voice calls, text messages, instant messages, multimedia messages, email, and the like.

In one embodiment, a gatekeeper function is employed to control communications intended for a target user, who is associated with an e-reader device. The gatekeeper function detects an attempt by an originating user to communicate with the target user. Upon detecting the attempt to communicate with the target user, the gatekeeper function determines a communication processing action that controls how to handle the communication attempt based on e-reader session information that is collected while the target user is engaged in an e-reader session. The gatekeeper function will then effect the communication processing action to control how the communication attempt is to be handled.

Another embodiment provides functions that automatically gather data from e-reader sessions to allow eBook readers the opportunity to share the information gathered with other individuals or entities. The automatically gathered e-reader session data can be, but is not limited to, eBook information, e-reader device specifications, consumption information, reader metrics, and interaction options and analysis. Such information is usable by individual originating users to make eBook purchase decisions, whereas such information is usable by others to determine users' likes and dislikes for various purposes such as marketing purposes.

In either embodiment, digital rights management (DRM) rights to eBook content may be acquired to enable an originating user to perform an e-reader interaction option that allows the originating user to view the target user's eBook metadata via the originating communication device, provided the originating communication device has the capability to present such information. The eBook metadata can be, but is not limited to, the target user's e-reader session table of contents, pages around the target user's current eBook location, and summary information of content around the target user's current eBook location. The DRM rights are temporary and may be granted for the duration of the target user's e-reader session state and interaction options, for a present communication session, and so on.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 8A and 8B are a flow diagram depicting an example sequence of interactivity between an originating user and a target user's e-reader device in accordance with an embodiment of the present disclosure.

FIGS. 10A and 10B are a sequence diagram depicting a sliding DRM scheme for granting DRM rights to an originating user in accordance with the present disclosure.

FIG. 12 is a block diagram of the e-reader according to one embodiment of the present disclosure.

FIG. 13 is a block diagram of the DRM server according to one embodiment of the present disclosure.

FIG. 14 is a block diagram of the e-content server according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In one embodiment, a gatekeeper function is employed to control communications intended for a target user, who is associated with an e-reader device. The gatekeeper detects an attempt for an originating user to communicate with the target user. Upon detecting the attempt to communicate with the target user, the gatekeeper determines a communication processing action that controls how to handle the communication attempt based on e-reader session information that is collected while the target user is engaged in an e-reader session. The gatekeeper will then effect the communication processing action to control how the communication attempt is to be handled.

Figure 1:
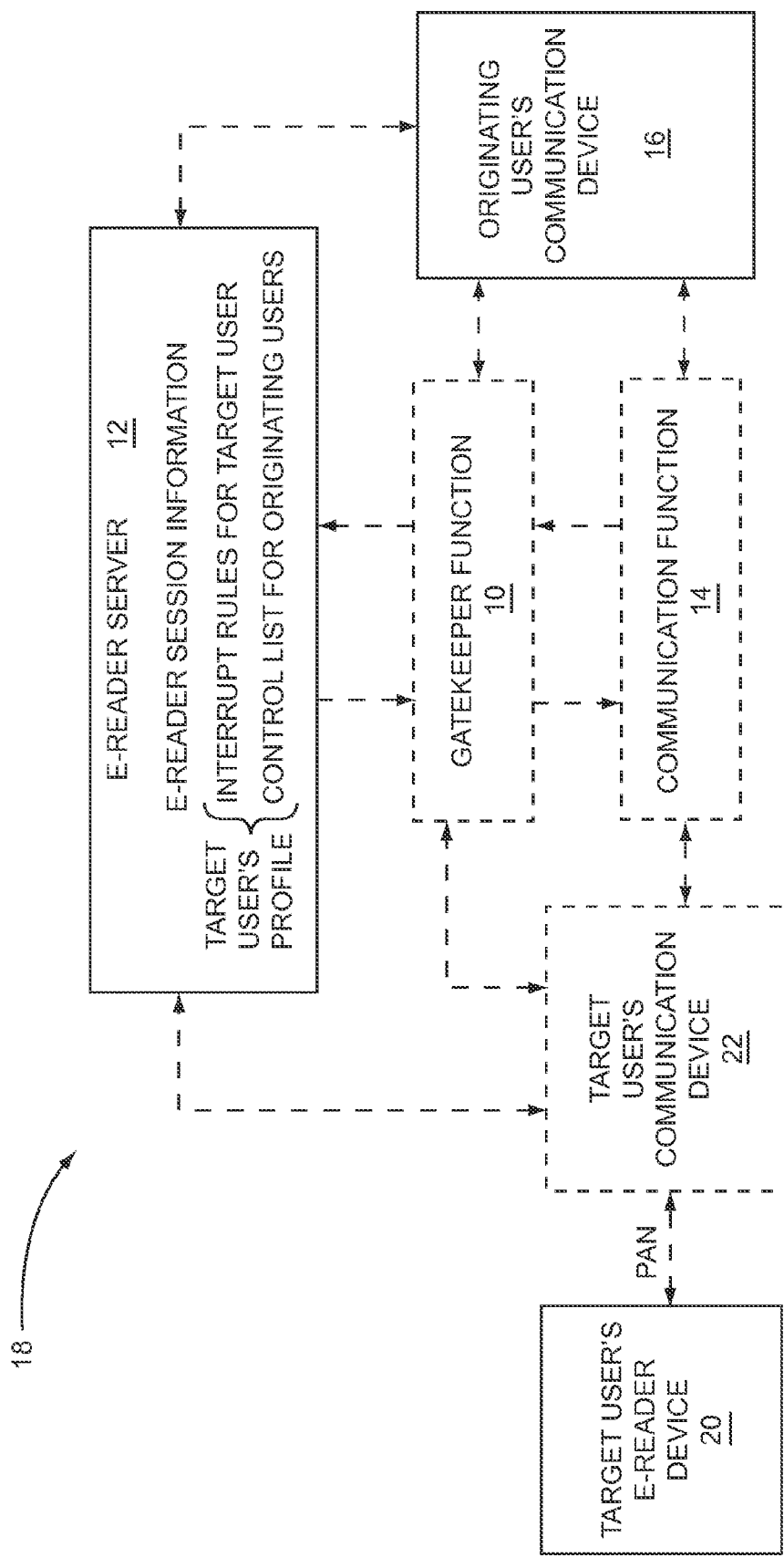
FIG. 1 is a block diagram representation of a system for managing communication during an e-reader session according to one embodiment of the present disclosure.
Figure 2:
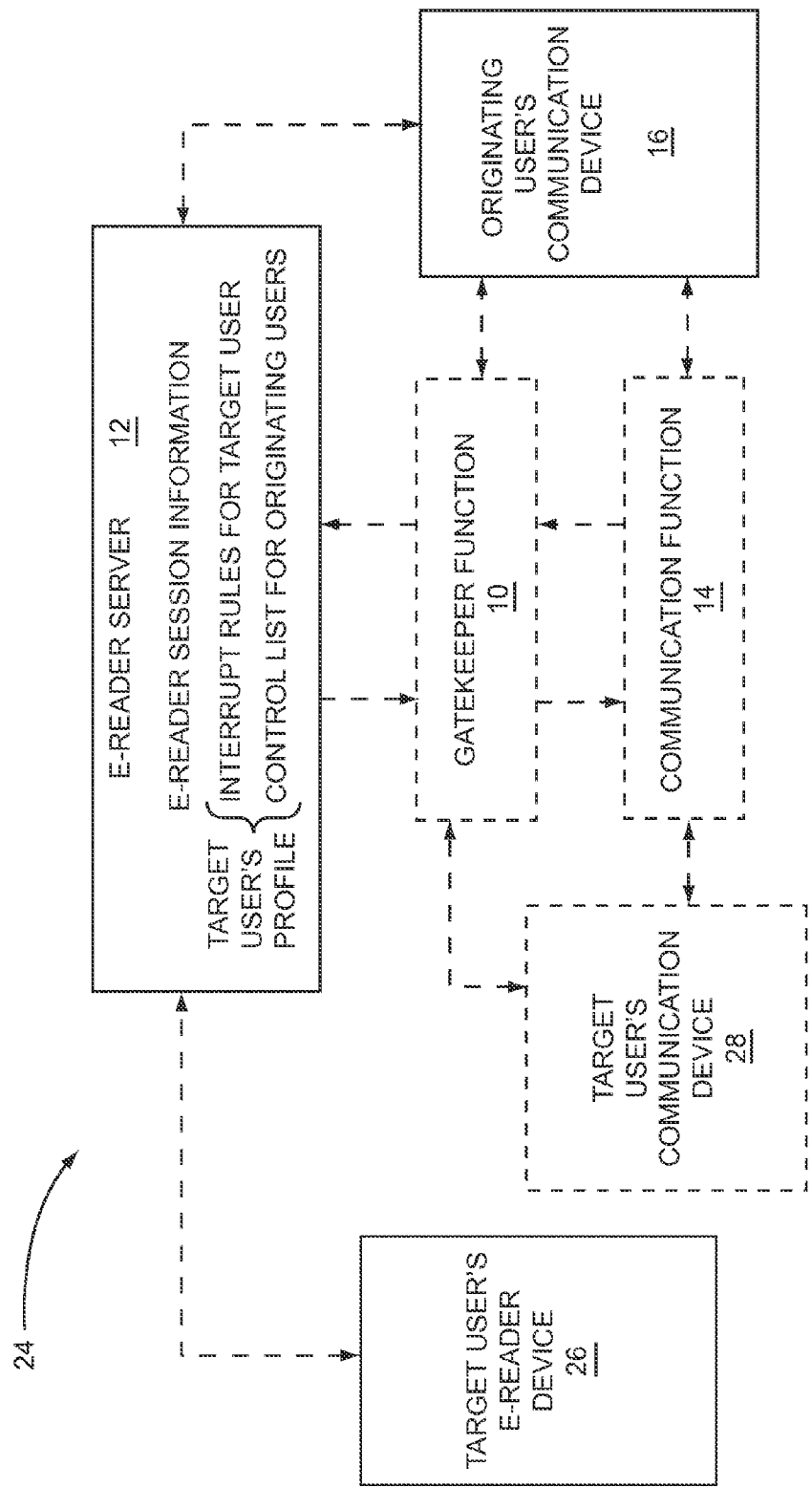
FIG. 2 is a block diagram representation of a system for managing communication during an electronic reader (e-reader) session according to another embodiment of the present disclosure.
Figure 3:
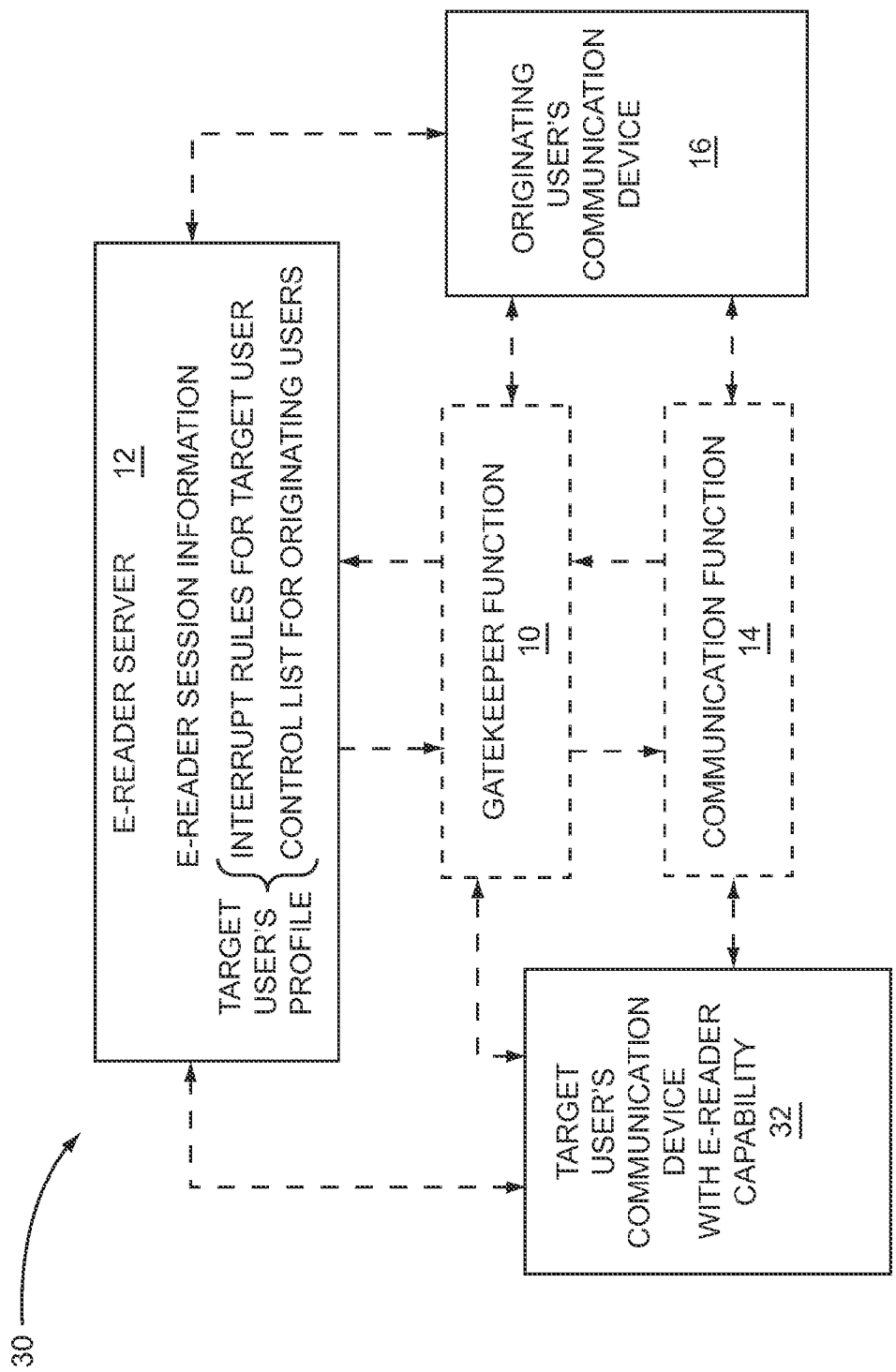
FIG. 3 is a block diagram representation of a system for managing communication during an e-reader session according to yet another embodiment of the present disclosure.

Referring to FIGS. 1-3, a gatekeeper function 10 cooperates with an electronic reader (e-reader) server 12 and a communication function 14 to control communication attempts such that undesired interruptions of target users' e-reader sessions are controlled. The e-reader server 12 maintains a target user profile that includes the target user's interruption rules along with communication control instructions that are associated with data such as a control list of communication originating users. The interruption rules, communication control instructions and control lists of communication originating users are useable to selectively filter how and when particular originating users communicate with a target user. The target user profile is useable by the gatekeeper function 10 to determine a communication processing action that is useable by the communication function 14 to handle communication requests generated by an originating user's communication device 16. A process of following the rules created by the target user is implemented by the gatekeeper function 10, which is programmable to automatically process the rules once a communication attempt is detected. The originating user's communication device 16 can be a dumb device, such as a plain old telephone service (POTS) device, or an intelligent device, such as a mobile telephone device, personal computer, and the like.

With reference to FIG. 1, a communication environment 18 is illustrated where communications intended for a target user associated with an e-reader device 20 are controlled by the gatekeeper function 10. As depicted in FIG. 1, the target user's e-reader device 20 can be of a type that includes a personal area network (PAN) interface such as a Bluetooth interface that is useable to communicate with a target user's communication device 22 having a compatible PAN interface. The target user's e-reader device 20 uses the PAN interface to download electronic content (e-content) that may be routed through the target user's communication device 22.

A present example of an e-reader device of the type shown in FIG. 1 is the Brother SV-100B, which is specifically designed to be a standalone e-reader device. The Brother SV-100B includes a PAN interface having a Bluetooth radio for communicating with devices such as a Bluetooth capable cellular telephone. Other PAN capable devices such as Personal Digital Assistants (PDAs) having electronic book (eBook) reader applications are also useable as the target user's e-reader device 20. In either instance, the target user's e-reader device 20 communicates with the e-reader server 12 via the target user's communication device 22.

With reference to FIG. 2, a communication environment 24 is illustrated where communications intended for a target user associated with an e-reader device 26 are controlled by the gatekeeper function 10. In this case, the target user's e-reader device 26 is a stand-alone e-reader device specifically designed for the purpose of displaying eBook content. However, in contrast to the target user's e-reader device 20 of FIG. 1, the target user's e-reader device 26 of FIG. 2 is capable of communicating directly with the e-reader server 12. Thus, no direct communication between the target user's e-reader device 26 and a communication device 28 associated with the target user is necessary for the transmission of e-reader session information between the target user's e-reader device 26 and the e-reader server 12.

Moreover, the target user's e-reader device 26 can, depending on the make and model, receive originating email communications sent to an email address setup for the target user. As a result, originating email or other communications directed specifically at the target user's e-reader device 26 are controlled by the gatekeeper function 10 without necessarily generating any interaction with the target user's communication device 28. This additional control responsibility is provided because email communication could possibly be directed to both the target user's communication device 28 and the target user's e-reader device 26 via different email accounts.

However, in the communication environment 24, the target user's e-reader device 26 does not replace the communication functionality of the target user's communication device 28. As such, the gatekeeper function 10 cooperates with the e-reader server 12 and the communication function 14 to control communications intended to be received by the target user's communication device 28. In this way, interruptions of the target user's e-reader session as a result of communication attempts directed to the target user's communication device 28 will be controlled in accordance with the target user's e-reader profile.

An Amazon.com Kindle™ is an example of a standalone e-reader device that is presently suitable to be the target user's e-reader device 26. The Kindle™ includes a wireless transceiver for communicating over a Code Division Multiple Access (CDMA) network. As such, the Kindle™ has the capability to communicate directly with the e-reader server 12 as well as with e-content servers and the like. The Kindle™ can also receive email addressed to the target user.

With reference to FIG. 3, a communication environment 30 is illustrated wherein a target user's e-reader device 32 includes the typical communication functionality of a mobile telephone device. In other words, the target user's e-reader device 32 can be an intelligent telephone device as long as the intelligent telephone device includes enough memory to store e-content along with an e-reader software application combined with enough processing capabilities to execute the e-reader software application. A present day example of an intelligent telephone device is an iPhone™ smart phone, manufactured by Apple Computer of Cupertino, Calif. A present day example of an e-reader software application is known as Stanza and is offered by Lexcycle LLC, which at present is owned by Amazon.com.

As depicted in FIG. 3, the e-reader server 12 can be remotely located from the target user's e-reader device 32. In this case, the target user's e-reader device 32 exchanges data with the e-reader server 12 via a wide area network (WAN) such as the Internet. One advantage in having the e-reader server 12 remotely located from the target user's e-reader device 32 is that the e-reader server 12 can provide the target user's e-reader device 32 with archival e-reader session data in the event the target user's e-reader device 32 loses e-reader session data due to low memory capacity or some other data loss incident. For example, the archival data may include information such as the last page presented in the previous e-reader session.

Alternately, the e-reader server 12 can be an application that runs on the target user's e-reader device 32, provided that the target user's e-reader device 32 has enough memory and processing capabilities to accommodate the e-reader server 12 along with an eBook and an e-reader application. Moreover, provided with enough memory and processing capabilities, the target user's e-reader device 32 could also accommodate and execute a software application that provides the gatekeeper function 10.

Figure 4:
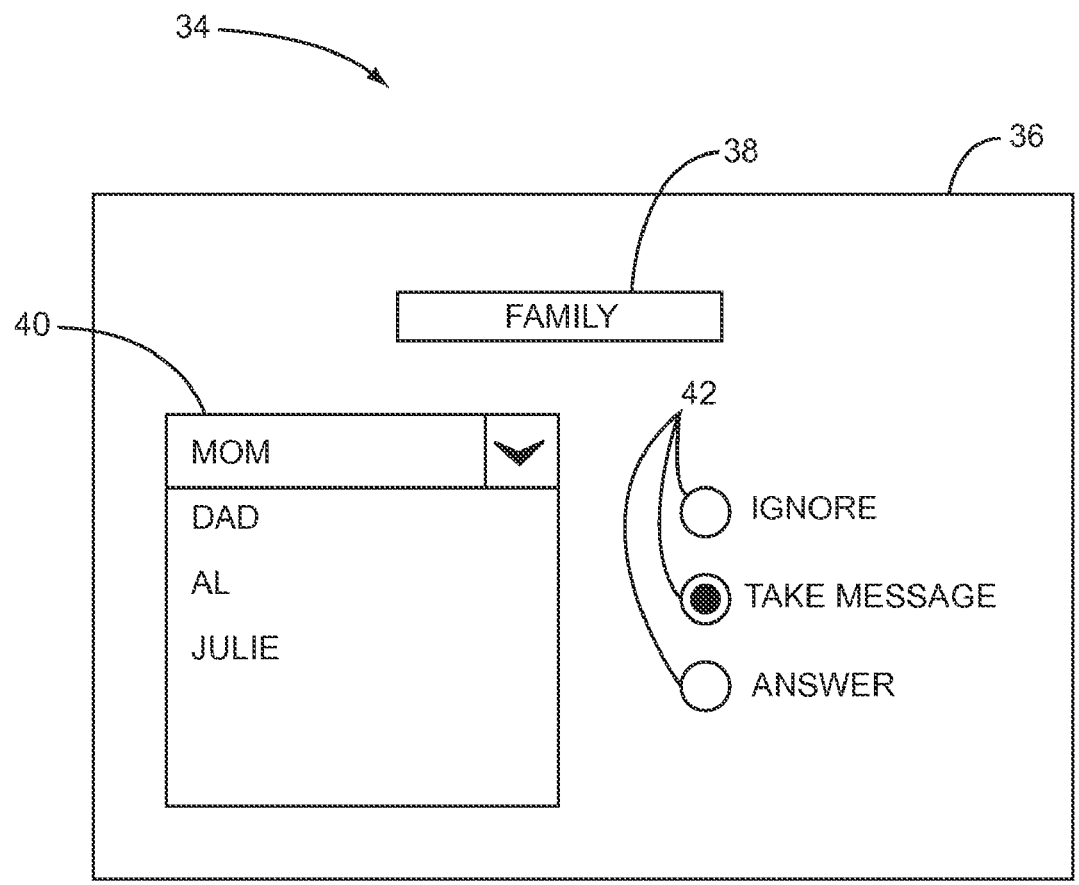
FIG. 4 depicts a preferences interface in the form of a web page in accordance with an embodiment of the present disclosure.

As shown in FIG. 4, the e-reader server 12 (FIGS. 1-3) can provide a preferences interface 34 for the target user to input his preferences pertaining to communication management for e-reader sessions. The preferences interface 34 could be a web page 36 having graphical user interface (GUI) elements such as a text box 38, a list box 40, radio buttons 42, and the like. The target user's preferences can be, but are not limited to, communication handling control lists associated with individual originating users and/or originating entities, interruption priority levels, and interruption instructions, such as leave a voice message, vibrate the e-reader device, or insert an alert icon. The target user's preferences inputted via the preferences interface 34 are stored by the e-reader server 12.

Moreover, the target user can use the preferences interface 34 to configure the e-reader server 12 such that the availability of interactive options are granted by user identification. For example, an e-reader user would likely configure the e-reader server 12 to allow a close family member to immediately interrupt an e-reader session to leave an urgent message or to communicate directly with the target user. Conversely, the target user could configure the e-reader server 12 such that others could only leave appropriately delayed communications to control interruptions of a protected e-reader session.

The preferences interface 34 is also useable to configure the e-reader server 12 to automatically collect and store e-reader session data that is useable to determine when the most appropriate time for an originating communication to occur. The stored e-reader session data may include, but is not limited to, eBook metadata such as:

- book information (title, author, International Standard Book Number (ISBN), release date, reviews, table of contents, front/back cover images, related content, etc.);
- e-reader make, model, capabilities, personalization options, etc.;
- e-reader session location (page, chapter, sentence, etc.), consumption information such as content read/skipped/reread at varying levels of granularity (page, chapter, sentence, volume, etc.), reading metrics such as reading cadence;
- e-reader content (summary of current location, current location content, etc.);
- e-reader interaction options (leave a message, interrupt, content preview, content purchase, etc.); and
- e-reader interaction analysis (recommended/permissible locations for specific interactions, etc.).

For example, the e-reader server 12 could use collected e-reader session metrics such as reading cadence and page number to compute the most appropriate time in the future for an originating communication to occur. Alternately, the e-reader server 12 could push or deliver data to the originating user's communication device 16 (FIGS. 1-3), so that the originating user could, within boundaries of the target user's preferences, judge where within the e-reader session the communication should occur or be encountered if the communication is recorded or stored. For example, the e-reader server 12 could send information about the quality of the current e-reader session content. For instance, the target user may be in a relatively non-interesting section of an eBook or, in contrast, the target user may be in a section of the eBook loaded with captivating content. If the former is true, then the originating user may decide to interrupt the target user immediately. However, if the latter is the case, then the originating user would likely request that the e-reader server 12 should select the next less captivating eBook section to interrupt the target user with the originating communication. The e-reader server 12 could also offer the originating user various message alert options or communication attempt indicators such as a selection of alert icons with message text insertion or bubbles, links to multimedia such as audio and video, and/or text effects such as animation and color change. Further still, the message alert options can be, but are not limited to, e-reader device vibration and background or foreground shading/color change.

The e-reader server 12 can also be configured to respond to data requests that come from the originating user's communication device 16 as well as issue instructions to the originating user's communication device 16 that will ultimately help an originating user associated with the originating user's communication device 16 decide how to proceed with a communication attempt directed at the target user such that a potential interruption of the target user's e-reader session due to the communication attempt will be controlled. In other words, the e-reader server 12 also can send data and/or instructions to the originating user's communication device 16 that would help an originating user identify when to best attempt a communication and/or where in the current e-reader session a record of the communication attempt could be placed.

Figure 5:
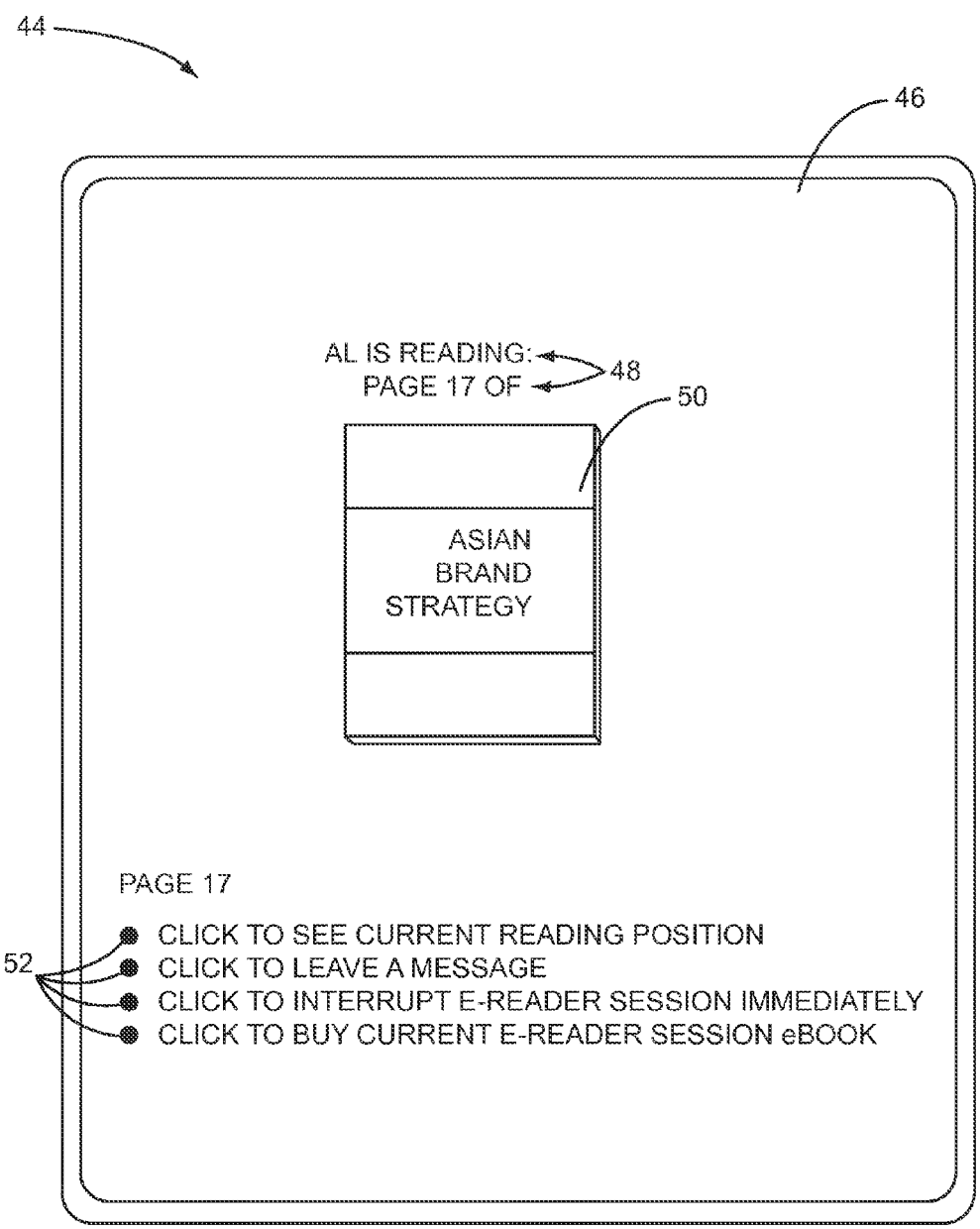
FIG. 5 is a depiction of a display screen of a smart phone communication device showing e-reader status and interactive options to an originating user according to the present disclosure.

FIG. 5 depicts a display screen 44 of the originating user's communication device 16 (FIGS. 1-3) with the assumption that the originating user's communication device 16 is a smart phone having functions needed to display graphical and textual content. As shown in FIG. 5, the display screen 44 of the originating user's communication device 16 includes a display area 46 wherein e-reader state information can be presented as text 48 and/or graphics 50. The display area 46 is also useable to present e-reader interaction options 52 to an originating user. In particular, the display screen 44 of the originating user's communication device 16 shows the originating user what the target user is reading, along with a selection of interaction options 52 that are available to the originating user. The interaction options 52 can be, but are not limited to, one or more of the following:
- view what and where the target user is currently reading;
- leave a non-interrupting message;
- interrupt reading immediately by placing a voice call;
- vibrate the target user's e-reader device;
- animate or shake images or text displayed on the target user's e-reader device display;
- purchase the current e-reader session eBook through an online book distributor; and
- interaction using a combination of any of the above.

As an example of an e-reader interaction option, the originating user's communication device 16 provides the originating user with the ability to automatically select or recommend the next best spot to place a call back message within the content of an eBook being read from the display of the target user's e-reader device 32 (FIG. 3). A query to the e-reader server 12 (FIG. 3) returns a collection of locations that represent the best places to leave a communication attempt indicator or notification or message based on semantic analysis of the eBook's content, analysis of the target user's e-reader session information, and/or the target user's preferences. The originating user can also navigate the eBook's contents to manually place a call back note or a communication attempt indicator within the boundaries of the target user's established profile. Moreover, the originating user can navigate at different levels of abstractions such as the table of contents, chapter, lesson, paragraph, topic, problem, sentence, and so on.

During a process of selecting a location for a message, the e-reader server 12 provides the originating user with an estimated time of arrival for the target user to reach an eBook content location based on the target user's session metrics of reading speed or cadence. The originating user can also time the message delivery with respect to the originating user's schedule. For example, the originating user's communication device 16 may have a record of the originating user having a meeting in ten minutes that will last for thirty minutes. Thus, the originating user can place a communication attempt indicator associated with a message to be delivered at a time that is convenient for the originating user's schedule as well as for the target user's schedule. The originating user's message may include, but is not limited to, media such as text, audio, Voice over Internet Protocol (VoIP), video, and digital images. The originating user's message may also include callback preferences, an image/icon of the originating user, an urgency level of the call, and so on.

Figure 6:
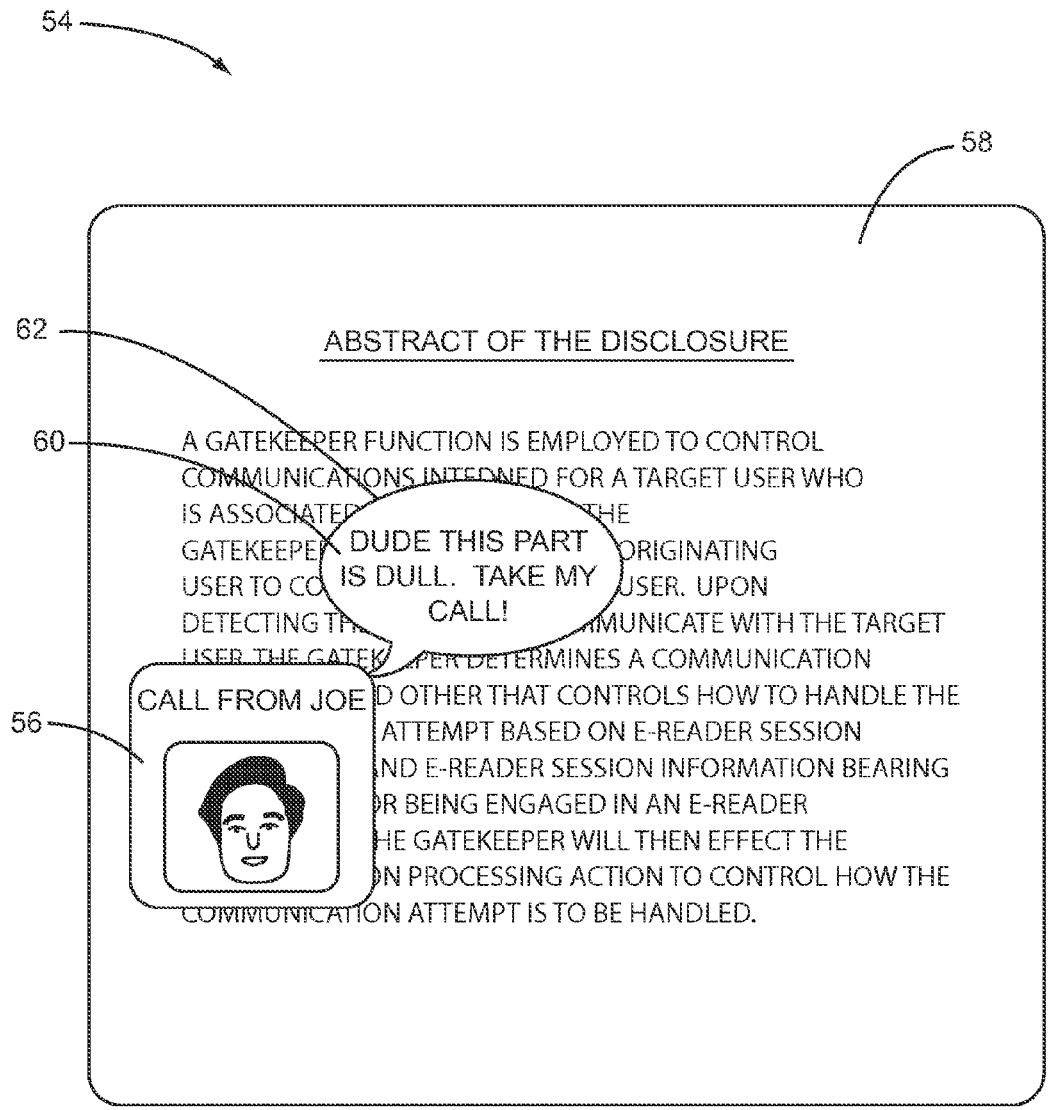
FIG. 6 depicts a display screen of a smart phone user terminal showing a message icon dropped into e-reader content for a reader to run into according to one embodiment of the present disclosure.

As shown in FIG. 6, the target user's e-reader device 32 (FIG. 3) includes a display screen 54, and in this particular example is depicted as having a communication attempt indicator in the form of a message icon 56 from an originating user named Joe. The message icon 56 is preferably displayed on an eBook page 58 such that a reader will run into the message icon 56 before or after finding more captivating eBook content. The message icon 56 can also include associated media 60 such as the example text shown in a message bubble 62.

The recipient of the communication notification icon 56 (i.e., the target user) has the option to:
- ignore the message;
- replay the message via text, email, or voice; and
- move the message icon 56 using a typical drag and drop process to another location in the eBook.

Regarding the above option to move an icon representing a message, a metadata server application feature can be set up by the target user such that an automatic callback occurs when the target user reaches a page that includes the moved message icon. As another option, on a touch based e-reader device, a user can touch the message icon with a gesture, such as a flick gesture, to have the application automatically move the communication attempt indicator, in this case a message icon to the next best location within the eBook content, which would be at a location substantially in advance of where the target user is currently reading. For the purposes of this disclosure, substantially in advance corresponds to a sufficient amount of time to allow the target user to finish reading a portion of the electronic content before reaching the communication attempt indicator. Moreover, the flick gesture could lead to a next best location as determined by semantic analysis, target user's e-reader session information, target user's preferences and etc.

Moreover, regarding the ignore call option, the e-reader server 12 can be automatically configured to ignore calls or messages depending on how captivating various sections of the eBook may be. For example, captivating (e.g., action-packed or thrilling) sections of the eBook may be flagged such that the gatekeeper function 10 will be set to ignore calls that arrive during the time the target user is reading within the flagged captivating sections. The flags for captivating eBook sections can be dynamically defined by the current reader using the target user's e-reader device 32. Alternately, the flags for captivating eBook sections can be automatically generated by the e-reader server 12 using automatically shared data from other eBook readers.

In operation, an originating user using the originating user's communication device 16 selects a target user to communicate with. The selection of the target user may be achieved by dialing the target user's phone number, touching a displayed name or image of the target user presented on a display screen of the originating user's communication device 16, or by saying the target user's name into a microphone of the originating user's communication device 16. Alternately, the selection of the target user may be automatically initiated by an application running on the originating user's communication device 16. For example, a calendar application running on the originating user's communication device 16 may be programmed to monitor a calendar list of events to automatically contact the target user to invite the target user to a meeting or a game event.

Figure 7A:
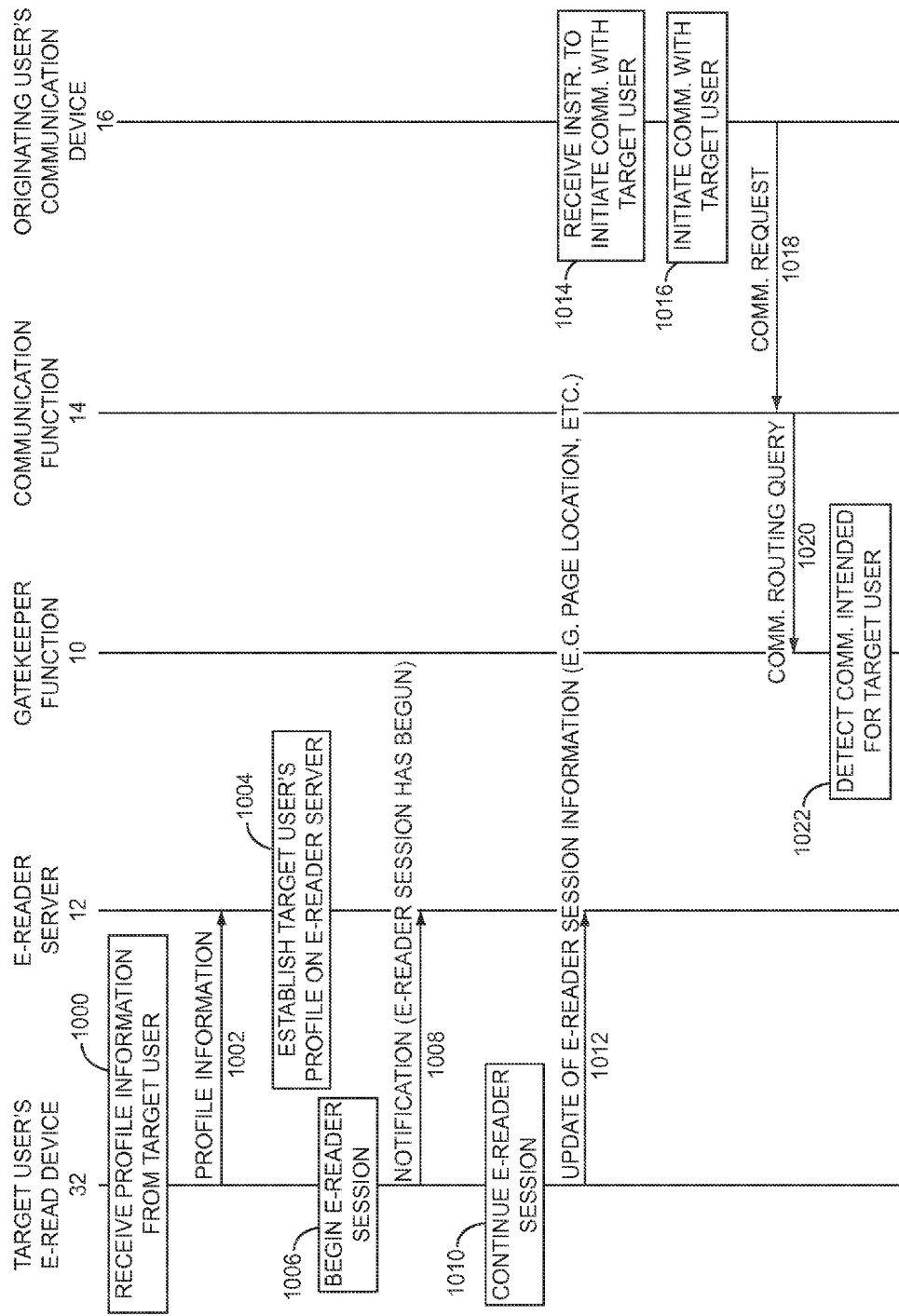
FIG. 7A is a flow diagram depicting an example sequence of a communication attempt directed to a target user in accordance with an embodiment of the present disclosure.
Figure 7B:
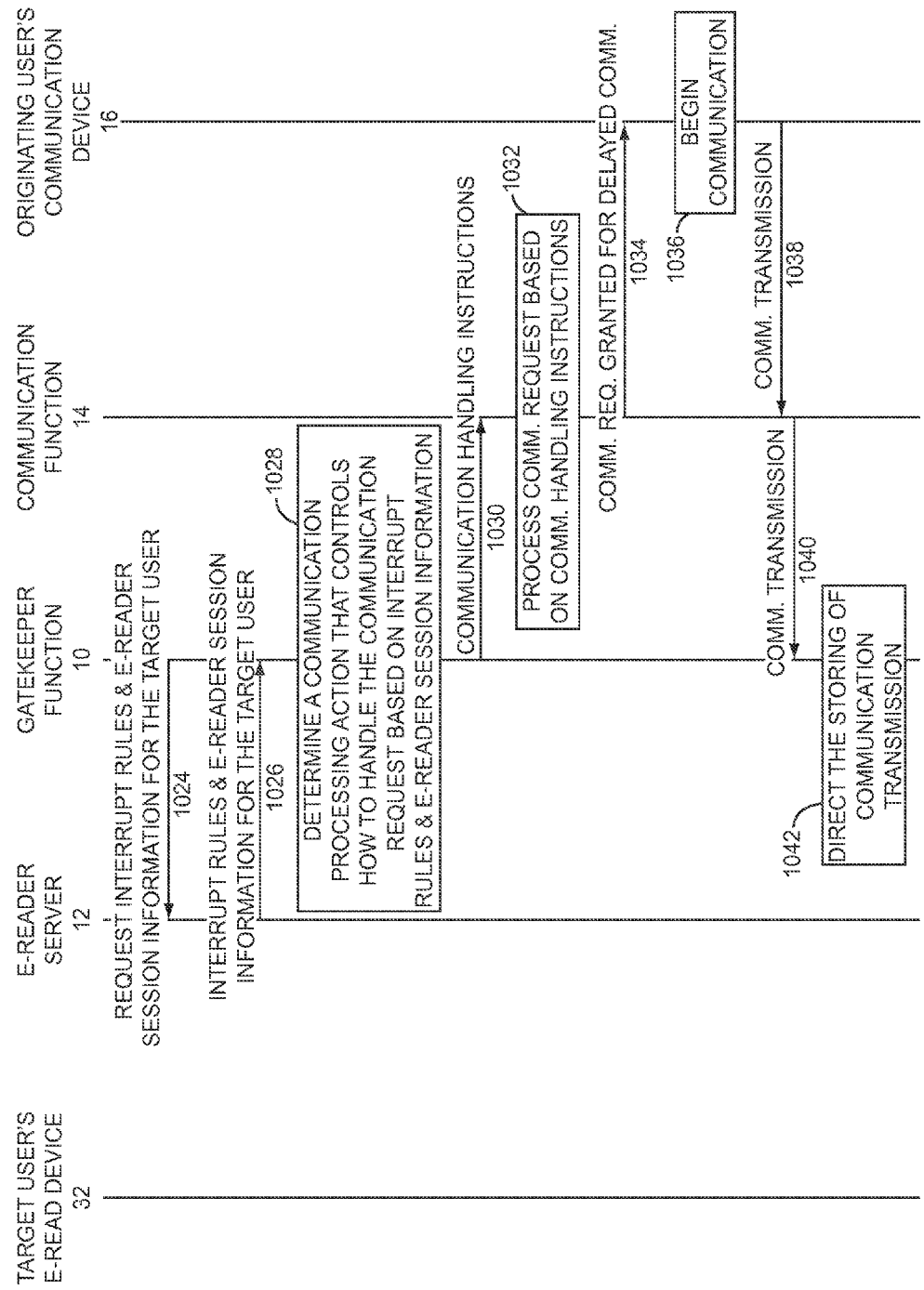
FIGS. 7B and 7C are a continuation of the flow diagram of FIG. 7A, including depicting an example sequence of a controlled communication attempt that places a communication notification with electronic book (eBook) content in accordance with an embodiment of the present disclosure.
Figure 7C:
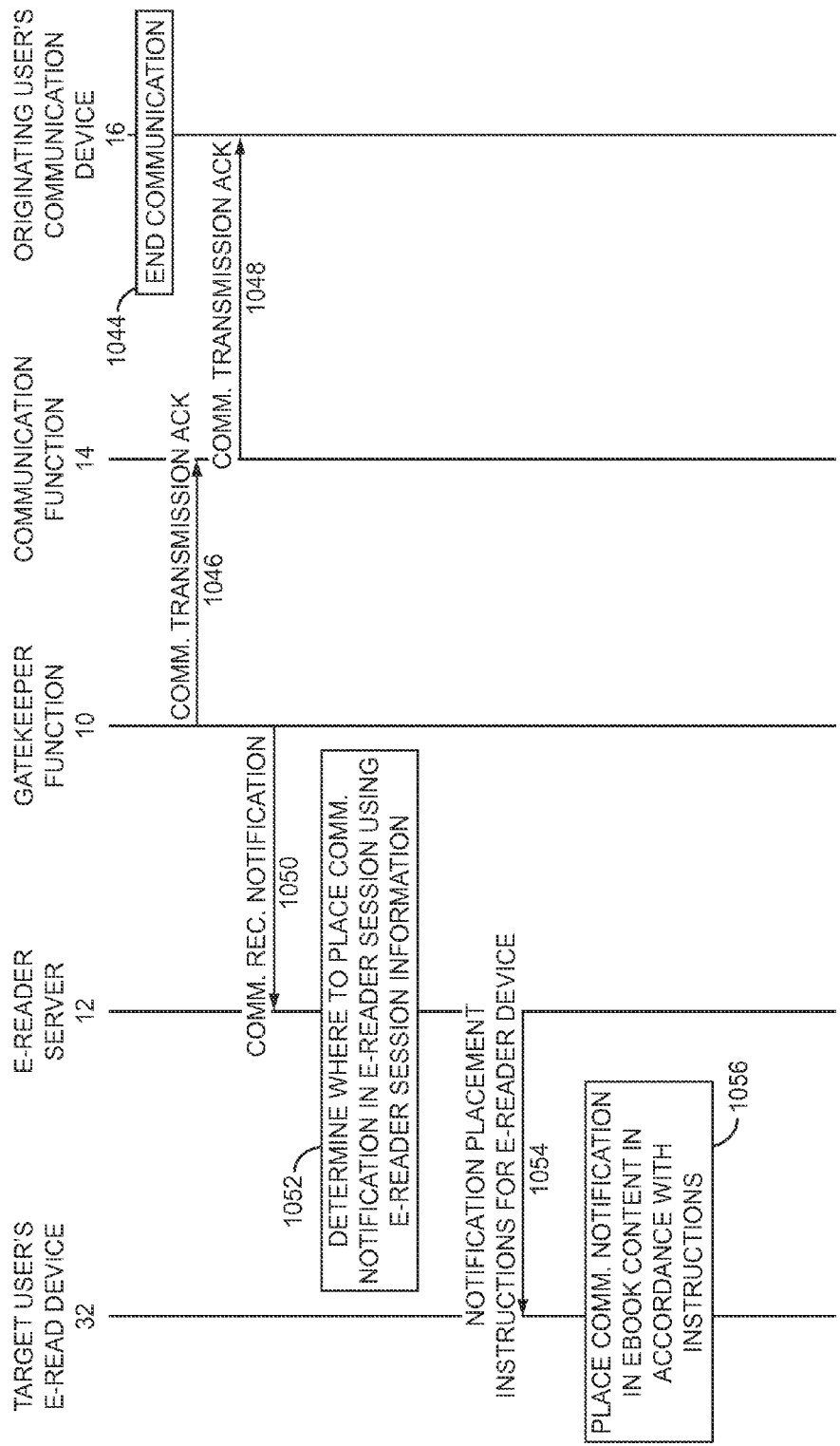

Turning now to FIGS. 7A through 7C, a communication flow diagram is provided to illustrate how communications intended for a target user are controlled. Starting with FIG. 7A, the target user's e-reader device 32 receives profile information from the target user (step 1000). The profile information is then passed along to the e-reader server 12 (step 1002), so that the e-reader server 12 can establish the target user's profile (step 1004). Once an e-reader session begins on the target user's e-reader device 32 (step 1006), a notification is sent to the e-reader server 12 (step 1008). The e-reader session continues (step 1010), and an update of the e-reader session information is sent to the e-reader server 12 (step 1012). For example, the update of the e-reader session information could be, but is not limited to, current page location and reading cadence.

The originating user's communication device 16 receives instructions (step 1014) to initiate communication with the target user (step 1016). Next, a communication request is sent from the originating user's communication device 16 to the communication function 14 (step 1018). In turn, a communication routing query is sent from the communication function 14 to the gatekeeper function 10 (step 1020). The gatekeeper function 10 then detects communication intended for the target user (step 1022). Turning now to FIG. 7B, a request for interrupt rules and e-reader session information for the target user is sent from the gatekeeper function 10 to the e-reader server 12 (step 1024). The e-reader server 12 responds to the information request by sending the interrupt rules and e-reader session information for the target user to the gatekeeper function 10 (step 1026).

The gatekeeper function 10 then processes the interrupt rules and e-reader session information for the target user to determine a communication processing action that controls how to handle the communication request (step 1028). Communication handling instructions are then passed from the gatekeeper function 10 to the communication function 14 (step 1030). The communication request is then processed by the communication function 14 using the communication handling instructions that include the processing action determined by the gatekeeper function 10 (step 1032).

The remainder of the communication flow diagram of FIGS. 7B and 7C illustrates a scenario wherein the target user is continuing in the current e-reader session. In this scenario, the communication request of FIG. 7A is ultimately granted by the communication function 14 for a delayed communication session with the target user to the originating user's communication device 16 (step 1034). The grant for a delayed communication session allows the originating user the opportunity to leave a communication for the target user to retrieve at a time that will be most convenient for the target user based upon the target user's profile and/or e-reader session information. For example, the originating user may leave a communication, such as a voice message, that can be recorded and stored on a voicemail server (not shown). Moreover, the originating user's communication may be delivered to the target user's e-reader device 32 in a background such that data associated with the communication is already provisioned when the target user arrives at a location where the communication is to be presented.

Next, the originating user begins communication via the originating user's communication device 16 (step 1036). A communication transmission is passed from the originating user's communication device 16 to the communication function 14 (step 1038). In turn, the communication transmission is passed along to the gatekeeper function 10 (step 1040). The gatekeeper function 10 then directs the storage of the communication transmission (step 1042).

Turning now to FIG. 7C, the originating user ends communication via the originating user's communication device 16 (step 1044), the gatekeeper function 10 passes an acknowledgement of the communication transmission end to the communication function 14 (step 1046). In turn, the communication function 14 passes the communication transmission end acknowledgement to the originating user's communication device 16 (step 1048).

Meanwhile, a communication notification is sent to the e-reader server 12 (step 1050). Upon receipt of the communication notification, the e-reader server 12 processes the current e-reader session information to determine where to place the communication notification such that the target user will find the notification either at a desired stopping point or within less captivating eBook content (step 1052). Once a determination of notification placement is made, the notification, along with placement instructions, is passed along to the target user's e-reader device 32 (step 1054). Upon receipt of the notification and placement instructions, the target user's e-reader device 32 places the communication notification within or outside the e-reader session in accordance with the placement instructions (step 1056). Alternately, the originating user's communication notification may be delivered to the target user's e-reader device 32 in a background such that data associated with the communication notification is already provisioned when the target user arrives at a location where the communication is to be presented.

Figure 8A:
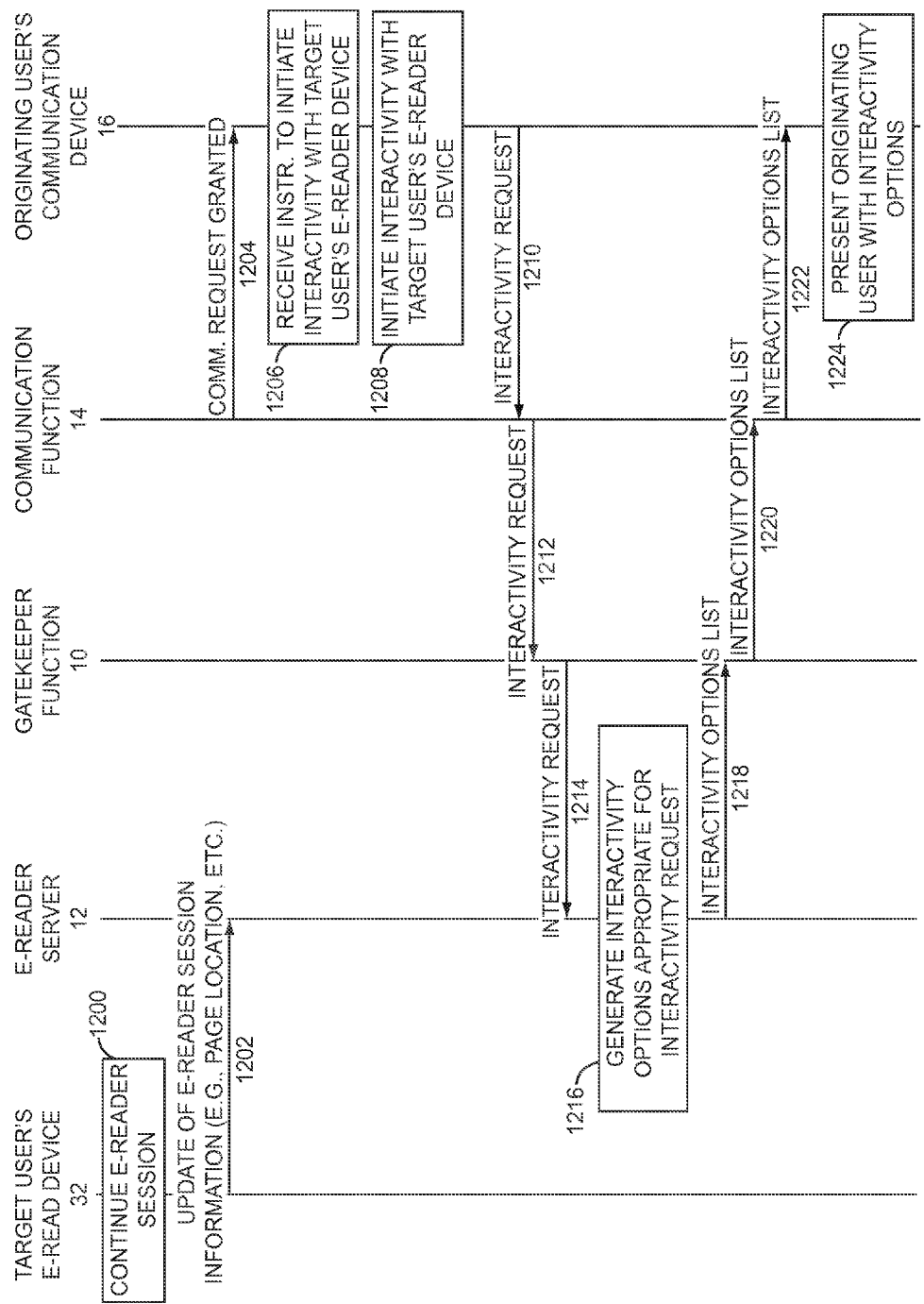

Another scenario, illustrated in FIGS. 8A and 8B, can be realized once the communication request of FIG. 7A is processed. In this particular scenario, the e-reader session continues (step 1200), and an update of the e-reader session information is passed to the e-reader server 12 (step 1202). Moreover, in this scenario a communication request is assumed to be granted by the communication function 14 for the originating user's communication device 16 (step 1204).

Once the originating user's communication device 16 receives permission to communicate with the target user's e-reader device 32, the originating user's communication device 16 will receive instructions from the originating user to initiate interactivity with the target user's e-reader device 32 (step 1206). Responsive to the received instructions, the originating user's communication device 16 will initiate interactivity with the target user's e-reader device 32 (step 1208) by sending an interactivity request to the communication function 14 (step 1210). The interactivity request is then forwarded from the communication function 14 to the gatekeeper function 10 (step 1212), which in turn passes the interactivity request along to the e-reader server 12 (step 1214). Alternately, some of the steps in FIG. 8A could be optimized. For example, steps 1210, 1212, and 1214 could be consolidated into a single step wherein the originating user's communication device 16 sends a message directly to the e-reader server 12 for an interactivity request. However, the communication and security capabilities of the e-reader server 12 and the originating user's communication device 16 should be considered before choosing to condense steps.

Once the e-reader server 12 receives the interactivity request, the e-reader server 12 generates an interactivities option list that is appropriate for the interactivity requested (step 1216). The interactivity options list is then sent to the gatekeeper function 10 (step 1218), which in turn passes the interactivity options list to the communication function 14 (step 1220). The interactivity options list is then sent from the communication function 14 to the originating user's communication device 16 (step 1222), which then presents the interactivity options list to the originating user (step 1224). As an alternative, the e-reader server 12 can initiate step 1216 to generate interactivity options without a request from the originating user's communication device 16. For example, the gatekeeper function 10 or the communication function 14 in step 1204 could send a signal to the e-reader server 12 to execute step 1216. Moreover, some of the steps could be optimized by condensing the steps to a single step. For example, steps 1210, 1212, and 1214 could be consolidated into a single step wherein the originating user's communication device 16 sends a message directly to the e-reader server 12 for the interactivity request. Similarly, steps 1218, 1220, and 1222 reporting an interactivity options list could also be consolidated.

Turning now to FIG. 8B, the originating user's communication device 16 then receives an interactivity option selection from the originating user (step 1226). The interactivity option selection is then sent to the communication function 14 (step 1228), which forwards the interactivity option to the gatekeeper function 10 (step 1230). The interactivity option is then passed from the gatekeeper function 10 to the e-reader server 12 (step 1232), which then processes the interactivity option selection to determine option processing instructions to send to the target user's e-reader device 32 based upon current e-reader session information and interrupt rules (step 1234). The option processing instructions are then sent to the target user's e-reader device 32 (step 1236), which executes the interactivity option section in accordance with the option processing instructions (step 1238). Alternately, and provided that there is a direct communication link between the originating user's communication device 16 and the e-reader server 12, the communication steps 1228, 1230, and 1232 that send an interactivity option selection could be consolidated into one step. Similarly, steps 1240, 1242, 1244, and 1246 that send an interactivity action response could also be consolidated into one step.

Based upon the success or failure or type of the option selection executed, an interactivity option response is sent from the target user's e-reader device 32 to the e-reader server 12 (step 1240). The interactivity option response is then sent from the e-reader server 12 to the gatekeeper function 10 (step 1242), which in turn forwards the interactivity option response to the communication function 14 (step 1244). The interactivity option response is then sent from the communication function 14 to the originating user's communication device 16 (step 1246), which then presents the interactivity option response to the originating user (step 1248).

Figure 9:
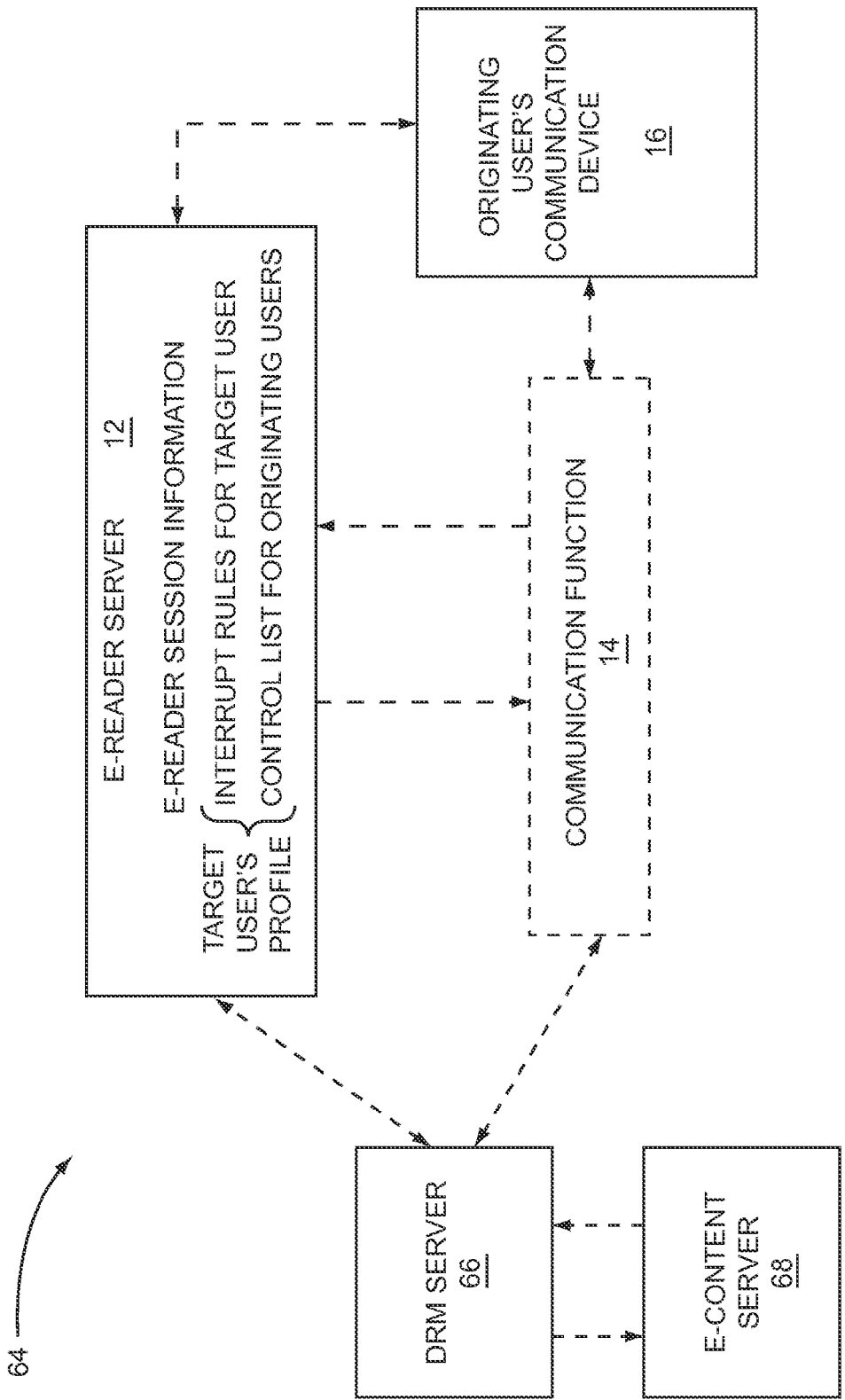
FIG. 9 is a block diagram of a communication environment that includes a Digital Rights Management (DRM) server and an electronic content (e-content) server in accordance with an embodiment of the present disclosure.

FIG. 9 depicts a communication environment 64 in which an originating user can request access to Digital Rights Management (DRM) protected e-content. A DRM server 66 for controlling access to e-content can communicate with the e-reader server 12 or alternately the DRM server 66 can communicate with the originating user's communication device 16 by way of the communication function 14. An e-content server 68 accepts licenses generated by the DRM server 66 in order to package or bind a requested e-content selection for delivery to the originating user.

Figure 10A:
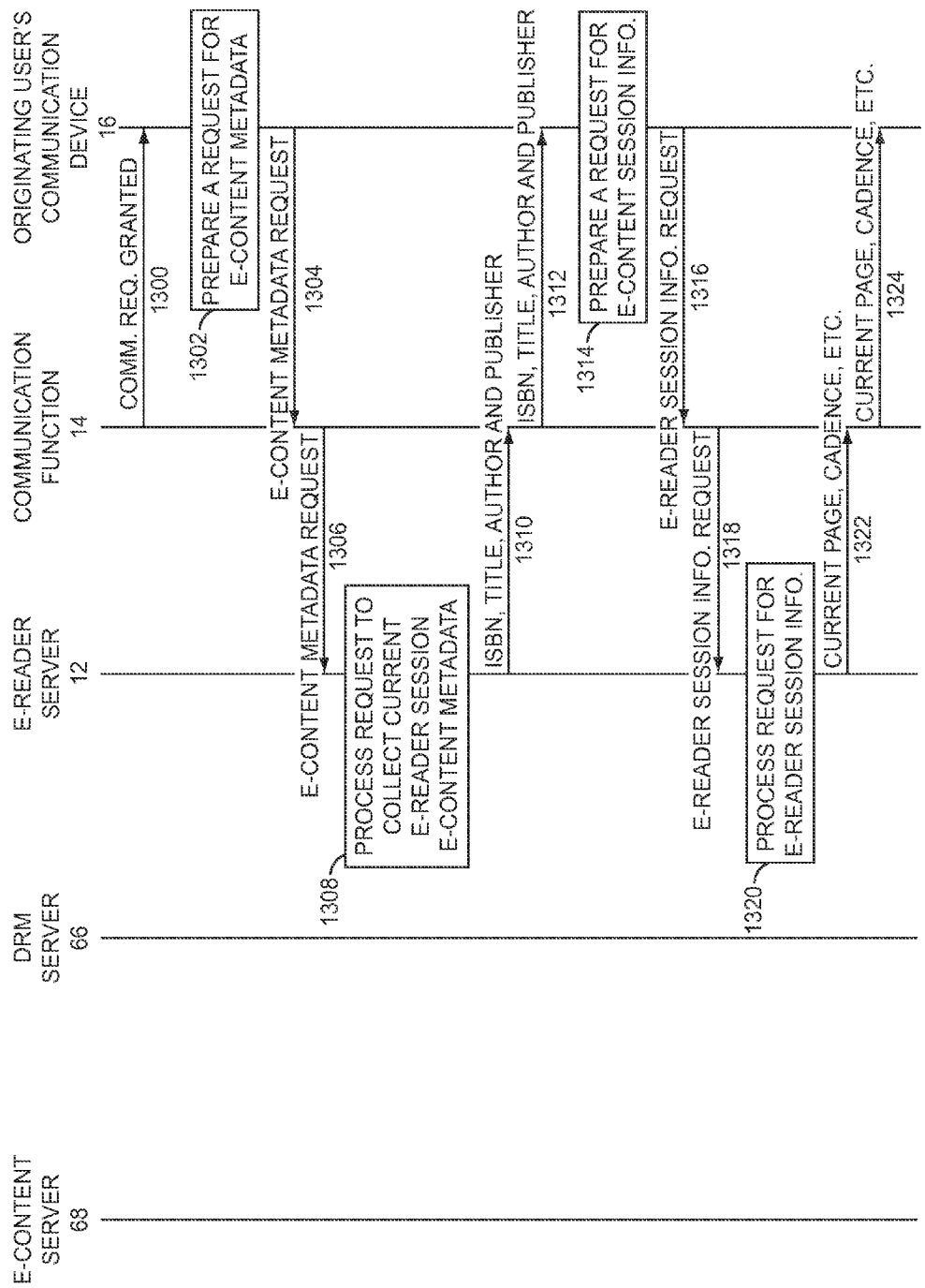

FIGS. 10A and 10B illustrate a scenario in which an originating user wants to view a selection of DRM protected e-content from a target user's e-reader session. In this scenario, the target user is continuing an e-reader session that began as shown in FIG. 7A. The scenario begins with an assumption that a communication request has been granted by the communication function 14 for the originating user's communication device 16 (step 1300). However, the steps of FIGS. 10A and 10B could also be initiated when the originating user is selecting interactively options such as leaving a message, having a communication rejected, etc.

At this point, the originating user's communication device 16 prepares a request for e-content metadata, such as, but not limited to, title, author, ISBN, table of contents, and front and back cover images (step 1302). The e-content metadata request is then sent to the communication function 14 (step 1304), which in turn sends the e-content metadata request to the e-reader server 12 (step 1306). The e-content metadata request is then processed by the e-reader server 12 to collect e-content metadata associated with the target user's current e-reader session (step 1308). The collected e-content metadata, such as ISBN, title, author, and publisher, are then sent to the communication function 14 (step 1310), which in turn passes the e-content metadata to the originating user's communication device 16 (step 1312). Alternately, the e-reader server 12 could initiate step 1308 to collect current e-reader session e-content metadata without a request from the originating user's communication device 16. For example, the communicating function in step 1300 could send a signal to the e-reader server 12 to execute step 1308. Further still, steps 1308 and 1320 that process requests to collect current e-reader session e-content metadata and process requests for e-reader session information could be consolidated into one step. Moreover, the e-reader server 12 could initiate such a consolidated step without a request from the originating user's communication device 16.

Next, the originating user's communication device 16 prepares a request for e-reader session information (step 1314). The e-reader session information request is then sent to the communication function 14 (step 1316), which in turn passes the e-reader session information request on to the e-reader server 12 (step 1318). The e-reader server 12 then processes the e-reader session information request to gather data such as current page and reading cadence (step 1320), which is then sent to the communication function 14 (step 1322). The e-reader session information then arrives at the originating user's communication device 16 from the communication function 14 (step 1324).

Turning now to FIG. 10B, the originating user's communication device 16 processes e-content metadata to prepare a DRM license request for a selection of e-content associated with the gathered e-reader session information (step 1326). The e-content DRM license request is then sent directly to the communication function 14 (step 1328), which in turn sends the e-content DRM license request directly to the DRM server 66 (step 1330).

The DRM server 66 generates a license in response to the e-content DRM request (step 1332). The e-content license is then sent to the e-content server 68 (step 1334), which then packages or binds the selected e-content with a license (step 1336). The e-content and license is then sent to the DRM server 66 (step 1338), which in turn passes the e-content and license on to the communication function 14 (step 1340). The e-content and license is then sent from the communication function 14 to the originating user's communication device 16 (step 1342), which then presents the licensed e-content to the originating user (step 1344).

Figure 11:
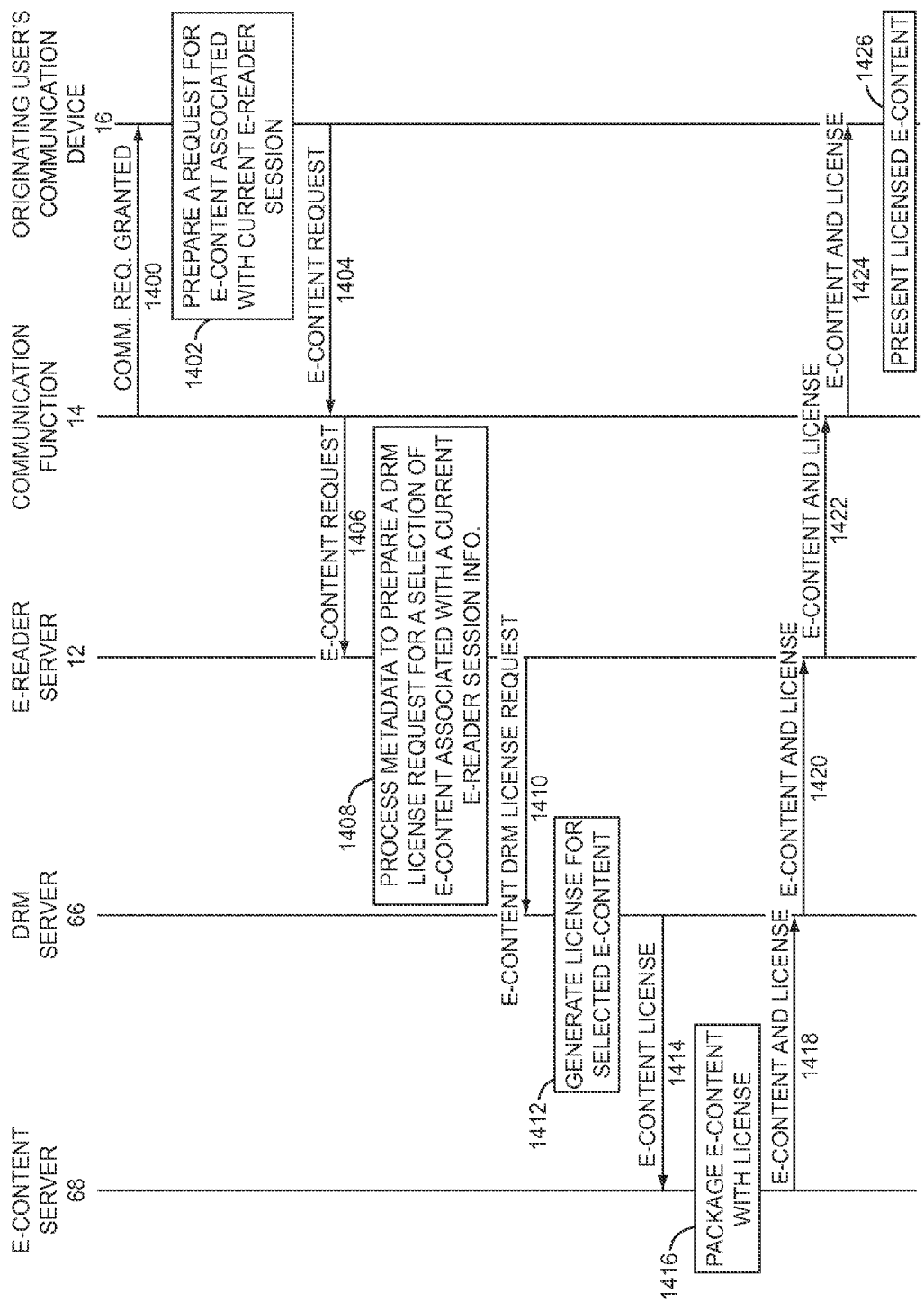
FIG. 11 is a sequence diagram depicting an alternate sliding DRM scheme for granting DRM rights to a call originator in accordance with the present disclosure.

With reference to FIG. 11, an alternate method for obtaining a license to access e-content is illustrated. Under the assumption that a communication request has been granted by the communication function 14 for the originating user's communication device 16 (step 1400), the originating user's communication device 16 prepares a request for e-content associated with the target user's current e-reader session (step 1402). The e-content request is sent to the communication function 14 (step 1404), which in turn passes the e-content request along to the e-reader server 12 (step 1406). As an alternative, the e-reader server 12 could periodically (e.g., once or twice a minute or so) or based on a trigger relevant to e-reader session events/data (e.g., a page turn or start a new chapter) execute step 1408. The e-reader server 12 could do this with the goal of having pre-fetched a license so when a request associated with step 1406 comes in, the e-reader server 12 can immediately respond. Moreover, step 1408 may be executed by the e-reader server 12 upon receiving a signal from the communication function 14 that the request was granted in step 1400 and then the e-reader server 12 can deliver the e-content and license to the originating user's communication device 16.

The e-reader server 12 then processes metadata associated with the target user's e-content session in order to prepare a DRM license request for a selection of e-content from the target user's current e-reader session (step 1408). The e-content DRM license request is then sent to the DRM server 66 (step 1410). A license for the desired e-content is then generated by the DRM server 66 (step 1412). The generated e-content license is then sent from the DRM server 66 to the e-content server 68 (step 1414). In response, the e-content server 68 packages or binds the desired e-content with the license (step 1416). The e-content and license is then sent from the e-content server 68 to the DRM server 66 (step 1418). The DRM server 66 in turn passes the e-content and license to the e-reader server 12 (step 1420), which in turn passes the e-content and license to the communication function 14 (step 1422). The e-content and license is then sent from the communication function 14 to the originating user's communication device 16 (step 1424), which in turn presents the licensed e-content to the originating user (step 1426).

With reference to FIG. 12, the e-reader server 12 includes a control system 70 associated with a memory 72 for storing software 74 and data 76. The software 74 can be, but is not limited to, server software code for establishing the target user's profile by way of the preferences interface 34 (FIG. 4), and server software code for collecting e-reader session information from target users' e-reader devices such as the target user's e-reader devices 20, 26, and 32 shown in FIGS. 1-3, respectively. Moreover, the data 76 can include, but is not limited to, a database for storing eBook metadata and e-reader session information automatically collected by the software 74 from target user e-reader sessions.

A communication interface 78 is provided for the e-reader server 12 to communicate with the gatekeeper function 10 (FIGS. 1-3) as well as with e-reader devices such as the target user's e-reader device 26 (FIG. 2), and the target user's e-reader device 32 (FIG. 3). Moreover, the communication interface 78 is further useable to communicate with target user communication devices such as the target user's communication device 22 (FIG. 1). Further still, the communication interface 78 is also useable to communicate with the originating user's communication device 16 (FIGS. 1-3).

With reference to FIG. 13, the DRM server 66 includes a control system 80 that is associated with a memory 82 for storing software 84 and data 86. The software 84 can be, but is not limited to, DRM software applications for ensuring the legal use of e-content by determining whether or not a license to access protected e-content is grantable for individual e-content requests. The data 86 can be, but is not limited to, metadata pertaining to e-content, DRM licensing rules, as well as licenses generated to grant access to e-content. A communication interface 88 is included to facilitate communication with other servers such as the e-reader server 12 (FIGS. 1-3 and 12).

With reference to FIG. 14, the e-content server 68 includes a control system 90 that is associated with a memory 92 for storing software 94 and data 96. The software 94 can be, but is not limited to, applications for binding e-content with licenses generated by DRM servers such as the DRM server 66 (FIGS. 9 and 13). The data 96 can be, but is not limited to, a library of e-content such as eBooks and electronic periodicals. A communication interface 98 is included to facilitate communication with other servers such as the DRM server 66.

Figure 15:
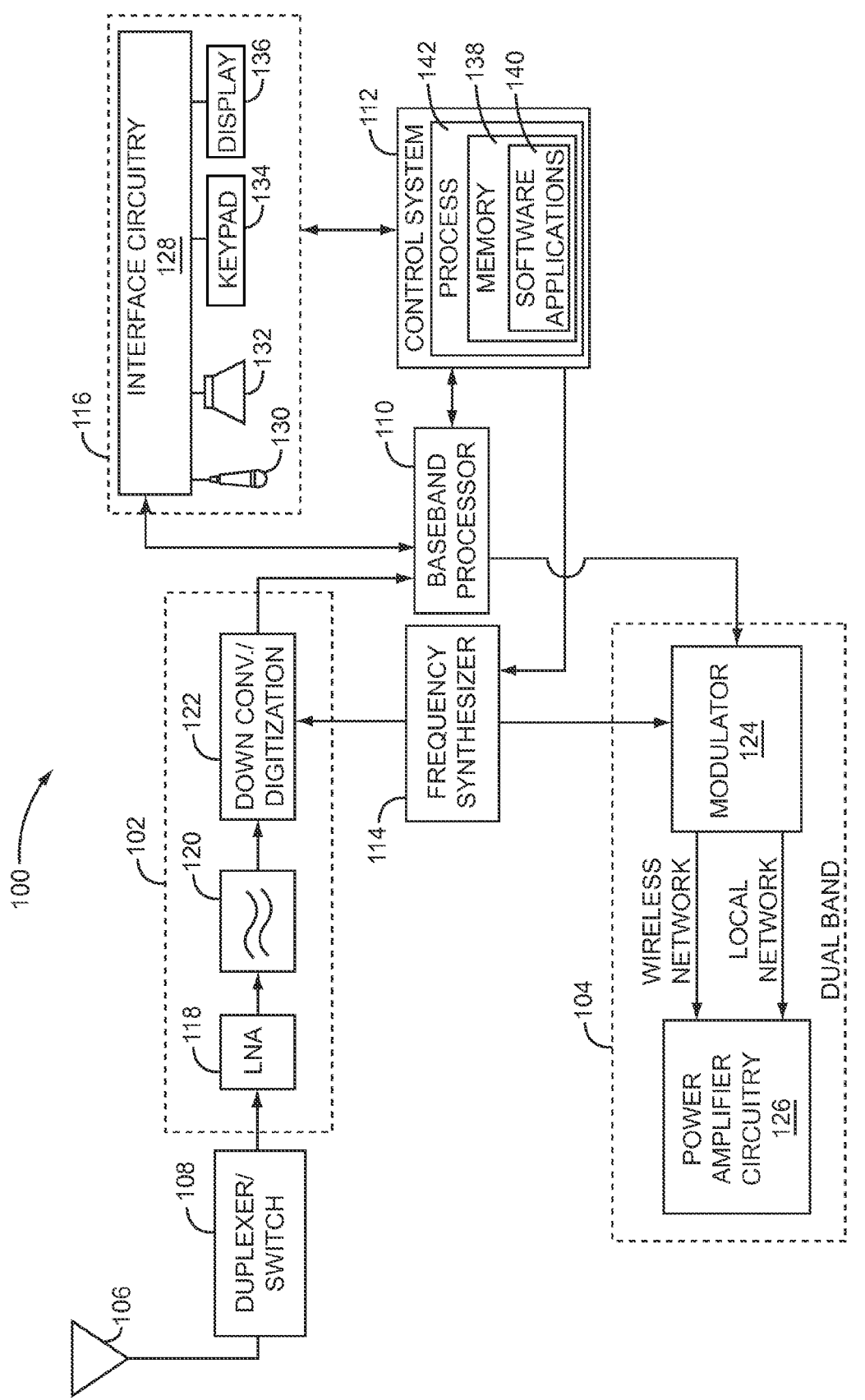
FIG. 15 is a block diagram of a wireless smart phone that can be used either as a user terminal (e.g., an e-reader device) or as an originating user communication device according to embodiments of the present disclosure.

FIG. 15 depicts the basic architecture of a wireless smart phone 100 that is useable as either the target user's e-reader device 32 or as the originating user's communication device 16. The wireless smart phone 100 may include a receiver front end 102, a radio frequency transmitter section 104, an antenna 106, a duplexer or switch 108, a baseband processor 110, a control system 112, a frequency synthesizer 114, and an interface 116. The receiver front end 102 receives information bearing radio frequency signals from one or more remote transmitters provided by a base station. A low noise amplifier 118 amplifies the signal. A filter circuit 120 minimizes broadband interference in the received signal, while downconversion and digitization circuitry 122 downconverts the filtered, received signal to an intermediate or baseband frequency signal, which is then digitized into one or more digital streams. The receiver front end 102 typically uses one or more mixing frequencies generated by the frequency synthesizer 114. The baseband processor 110 processes the digitized received signal to extract the information or data bits conveyed in the received signal. This processing typically comprises demodulation, decoding, and error correction operations. As such, the baseband processor 110 is generally implemented in one or more digital signal processors (DSPs).

On the transmit side, the baseband processor 110 receives digitized data, which may represent voice, data, or control information, from the control system 112, which it encodes for transmission. The encoded data is output to the radio frequency transmitter section 104, where it is used by a modulator 124 to modulate a carrier signal that is at a desired transmit frequency. Power amplifier circuitry 126 amplifies the modulated carrier signal to a level appropriate for transmission, and delivers the amplified and modulated carrier signal to the antenna 106 through the duplexer or switch 108.

Used as the originating user's communication device 16, the wireless smart phone 100 communicates with the communication function 14, the gatekeeper function 10, and the e-reader server 12. Accordingly, the receiver front end 102, the baseband processor 110, and the radio frequency transmitter section 104 cooperate to provide an interface for long range communication such as cellular telephone communication. Alternately, when used as the target user's communication device 22, the wireless smart phone 100 must be able to communicate with the target user's e-reader device 20. Accordingly, the receiver front end 102, the baseband processor 110, and the radio frequency transmitter section 104 cooperate to provide a short range wireless interface such as PAN interface in order to communicate with the target user's e-reader device 20 (FIG. 1). These functions may be implemented using redundant circuitry, or by configuring common circuitry to operate in different modes.

A user may interact with the wireless smart phone 100 via the interface 116, which may include interface circuitry 128 associated with a microphone 130, a speaker 132, a physical or virtual keypad 134, and a display 136. The interface circuitry 128 typically includes analog-to-digital converters, digital-to-analog converters, amplifiers, and the like. Additionally, the interface circuitry 128 may include a voice encoder/decoder, in which case the interface circuitry 128 may communicate directly with the baseband processor 110.

The microphone 130 will typically convert audio input, such as the user's voice, into an electrical signal, which is then digitized and passed directly or indirectly to the baseband processor 110. Audio information encoded in the received signal is recovered by the baseband processor 110, and converted by the interface circuitry 128 into an analog signal suitable for driving the speaker 132. The keypad 134 and the display 136 enable the user to interact with the wireless smart phone 100, input numbers to be dialed, address book information, or the like, as well as monitor call progress information.

The control system 112 includes a memory 138 for storing data and software applications 140, and a processor 142 for running the operating system and executing the software applications 140. When the wireless smart phone 100 is used as the target user's e-reader device 32 for reading eBooks, the memory 138 will be loaded with an e-reader software application along with eBook content. Moreover, provided that the memory 138 is large enough and the processor 142 is powerful enough, the e-reader server 12 and the gatekeeper function 10 could also be implemented on the wireless smart phone 100.

Those skilled in the art will recognize improvements and modifications to the preferred embodiments of the present invention. All such improvements and modifications are considered within the scope of the concepts disclosed herein and the claims that follow.

What is claimed is:

1. A method for controlling a communication attempt that originates from an originating user's communication device and is intended for a target user who is associated with an electronic reader (e-reader) device, the method comprising:
   detecting, downstream from the originating user's communication device, the communication attempt from the originating user to communicate with the target user;
   making a determination, in response to the communication attempt, that the e-reader device is in an e-reader session;
   obtaining e-reader session information associated with the e-reader session that identifies at least one of a current reading location of the target user and a reading cadence of the target user;
   based on the e-reader session information, determining a communication processing action for controlling how to handle the communication attempt; and
   effecting control of the communication attempt based on the communication processing action.

2. The method of claim 1 wherein communication types available to the originating user comprise at least one of a group consisting of: telephone, text messaging, multimedia, recorded voice, email, and any combination thereof.

3. The method of claim 1 wherein effecting control of the communication attempt is accomplished with a communication processing action that comprises at least one of a group consisting of: delaying the communication attempt and rerouting the communication attempt.

4. The method of claim 1 wherein the communication processing action corresponds to preventing the communication attempt from being presented to the target user.

5. The method of claim 4 further comprising determining a contact time in the future for the originating user to communicate with the target user, then effect delivery of the contact time to the target user.

6. The method of claim 4 comprising:
   predicting a contact time in the future for allowing the originating user to communicate with the target user based upon when the target user will arrive at a certain point within electronic content associated with the e-reader session; and
   sending the contact time to the originating user.

7. The method of claim 6 wherein predicting the contact time in the future comprises:
   selecting the contact time in the future based upon the e-reader session information.

8. The method of claim 4 further comprising effecting presentation of a communication attempt indicator to the target user to alert the target user of a communication attempt.

9. The method of claim 8 wherein the communication attempt indicator comprises at least one of a group consisting of: electronic content text animation, electronic content image animation, electronic content text shading or color change, electronic content background shading or color change, electronic content foreground shading or color change, an icon, a message text bubble, an audible sound, a link to multimedia, a vibration of the e-reader device, and any combination thereof.

10. The method of claim 8 wherein the communication attempt indicator is provided for the target user to encounter, the method further comprising determining the current reading location in electronic content associated with the e-reader session the target user is reading.

11. The method of claim 10 further comprising placing the communication attempt indicator near the current reading location in the electronic content.

12. The method of claim 10 further comprising:
   predicting an advanced location that is substantially ahead of the current reading location in the electronic content to place the communication attempt indicator forward of a determined location; and
   placing the communication attempt indicator at the advanced location.

13. The method of claim 12 wherein predicting the advanced location comprises:
   selecting the advanced location based upon the e-reader session information.

14. The method of claim 13, wherein the advanced location is at least one desirable interruption point.

15. The method of claim 12 wherein predicting the advanced location comprises:
   selecting the advanced location based upon a schedule associated with the originating user, and the e-reader session information.

16. The method of claim 15, wherein the advanced location is at least one desirable interruption point.

17. The method of claim 16 wherein the advanced location is at least one page in advance of the current reading location.

18. The method of claim 10 further comprising effecting moving the communication attempt indicator to an advanced location within the electronic content.

19. The method of claim 10 wherein the communication attempt indicator is associated with a message left by the originating user, the method further comprising replaying a recorded voice message or opening a text message or email.

20. The method of claim 1 further comprising effecting delivery of at least a portion of electronic content associated with the target user's e-reader session to the originating user.

21. The method of claim 20 wherein the at least a portion of the electronic content is associated with the current reading location of the target user.

22. The method of claim 21 wherein digital rights management (DRM) is employed to manage the originating user's access to the at least a portion of the electronic content associated with the target user's e-reader session.

23. The method of claim 20 further comprising:
determining where in the electronic content associated with the e-reader session the target user is reading;
predicting a forward section of electronic content based upon where the target user will be reading at a future time; and
selecting the predicted forward section of the electronic content to be the at least a portion of electronic content.

24. The method of claim 1 wherein a communication device associated with the target user is communicable with the target user's e-reader device by way of a personal area network.

25. The method of claim 1 wherein the target user's e-reader device communicates independent of other communication devices associated with the target user.

26. The method of claim 1 wherein the target user's e-reader device and an associated communication device are one in the same.

27. The method of claim 1 wherein communication attempts from two different originating users are controlled in different ways.

28. The method of claim 1, further comprising:
receiving from the originating user's communication device an interactivity request;
generating an interactivity options list for the interactivity request based on a target user's profile;
sending the interactivity options list to the originating user's communication device;
receiving an interactivity options selection from the originating user's communication device;
processing the selected interactivity option;
sending the processed interactivity option selection to the target user's e-reader device; and
sending an interactivity option response to the originating user's communication device.

29. The method of claim 28 wherein the interactivity options list that is available to the originating user comprises at least one of a group consisting of: view what and where the target user is currently reading, leave a non-interrupting message, interrupt reading immediately by placing a voice call, vibrate the target user's e-reader device, animate or shake images or text presented by the target user's e-reader device, purchase current e-reader session electronic content through an online electronic content distributor, and combinations thereof.

30. The method of claim 28 wherein a selection of the interactivity options list to view what the target user is currently reading results in a graphical representation associated with what the target user is reading being presented to the originating user via the originating user's communication device.

31. The method of claim 28 wherein a selection of the interactivity options list to view where the target user is currently reading results in a textual representation of the target user's reading position being presented to the originating user via the originating user's communication device.

32. A system for controlling communication from an originating user's communication device intended for a target user associated with an electronic reader (e-reader) device, the system comprising:
a communication interface; and
a control system associated with the communication interface and adapted to:
detect, downstream from the originating user's communication device, a communication attempt from the originating user to communicate with the target user;
make a determination, in response to the communication attempt, that the e-reader device is in an e-reader session;
obtain e-reader session information associated with the e-reader session that identifies at least one of a current reading location of the target user and a reading cadence of the target user;
based on the e-reader session information, determine a communication processing action for controlling how to handle the communication attempt; and
effect control of the communication attempt based on the communication processing action.

* * * * *